US012182179B1

(12) United States Patent
Aravamudan et al.

(10) Patent No.: US 12,182,179 B1
(45) Date of Patent: Dec. 31, 2024

(54) APPARATUS AND METHODS FOR GENERATING OBFUSCATED DATA WITHIN A COMPUTING ENVIRONMENT

(71) Applicant: nference, Inc., Cambridge, MA (US)

(72) Inventors: Murali Aravamudan, Andover, MA (US); Ajit Rajasekharan, West Windsor, NJ (US)

(73) Assignee: nference, Inc., Cambridge, MA (US)

( * ) Notice: Subject to any disclaimer, the term of this patent is extended or adjusted under 35 U.S.C. 154(b) by 0 days.

(21) Appl. No.: 18/629,594

(22) Filed: Apr. 8, 2024

(51) Int. Cl.
*G06F 16/28* (2019.01)
*G06F 21/62* (2013.01)
*G06F 40/20* (2020.01)

(52) U.S. Cl.
CPC ........ *G06F 16/285* (2019.01); *G06F 21/6218* (2013.01); *G06F 40/20* (2020.01)

(58) Field of Classification Search
CPC .... G06F 16/285; G06F 21/6218; G06F 40/20; G06F 40/30
See application file for complete search history.

(56) References Cited

U.S. PATENT DOCUMENTS

| | | | |
|---|---|---|---|
| 11,669,635 B1 | 6/2023 | Jeong et al. | |
| 11,847,245 B2 | 12/2023 | Truong et al. | |
| 2018/0032584 A1* | 2/2018 | Singh | G06F 16/248 |
| 2019/0156061 A1* | 5/2019 | Chakraborty | H04L 63/0421 |
| 2020/0265159 A1* | 8/2020 | Schmatz | H04L 9/008 |
| 2022/0076066 A1 | 3/2022 | Forgeat et al. | |
| 2023/0051718 A1* | 2/2023 | Ledvina | H04M 1/72457 |
| 2023/0153599 A1* | 5/2023 | Dalli | G06N 3/065 |
| 2023/0162726 A1 | 5/2023 | Akinwande et al. | |
| 2023/0252233 A1* | 8/2023 | Gutierrez | G06F 40/20 704/9 |
| 2023/0259787 A1* | 8/2023 | David | G06N 3/0455 706/15 |
| 2024/0119176 A1* | 4/2024 | Ardhanari | G06F 21/53 |
| 2024/0160900 A1* | 5/2024 | Smith | G06N 3/047 |

* cited by examiner

*Primary Examiner* — Hosain T Alam
*Assistant Examiner* — Cecile H Vo
(74) *Attorney, Agent, or Firm* — Caldwell Intellectual Property Law

(57) ABSTRACT

An apparatus for generating obfuscated data within a computing environment, comprising a processor and a memory containing instructions configuring the processor to access a database containing a plurality of private data elements belonging to at least a private record, generate a set of obfuscated data elements, representative of the at least a private record, as a function of the plurality of private data elements using an generative model, determine a first distance measure between at least an obfuscated data element within the set of obfuscated data elements and at least a private data element of the plurality of private data elements within the database, and verify the first distance measure is within a distance range, wherein a minimum threshold of the distance range is determined as a function of a deidentification parameter and a maximum threshold of the distance range is determined as a function of an obfuscation parameter.

16 Claims, 10 Drawing Sheets

APPARATUS AND METHODS FOR GENERATING OBFUSCATED DATA WITHIN A COMPUTING ENVIRONMENT

FIELD OF THE INVENTION

The present invention generally relates to the field of data processing and machine learning. In particular, the present invention is directed to an apparatus and methods for generating obfuscated data within a computing environment.

BACKGROUND

Vast amounts of data gathered from data-driven technologies may be used for training sophisticated machine learning models. These models have a wide range of applications from natural language processing and computer vision to complex decision-making systems in various domains. The effectiveness of these models may often be directly related to the quality and diversity of the data on which they are trained.

However, the use of real-world data presents significant challenges, such as, without limitation, challenges related to privacy and security. Data may often contain sensitive information that must be protected to comply with privacy regulations and ethical standards. In some cases, direct use of such data may lead to privacy breaches and unauthorized access to personal or pestilential information.

Although traditional approaches may reduce the risk of identifying individuals within datasets, they often degrade the utility of data which can impair the performance of machine learning models. Additionally, in cases involving complex data such as images or audio, traditional techniques such as, without limitation, anonymization techniques may be insufficient to prevent the re-identification of individuals due to the extensive information content in these data modalities.

SUMMARY OF THE DISCLOSURE

In an aspect, an apparatus for generating obfuscated data within a computing environment is described. The apparatus includes at least a processor and a memory communicatively connected to the at least a processor, wherein the memory contains instructions configuring the at least a processor to access a database containing a plurality of private data elements belonging to at least a private record, generate, using an generative model, a set of obfuscated data elements, representative of the at least a private record, as a function of the plurality of private data elements, determine a first distance measure between at least an obfuscated data element within the set of obfuscated data elements and at least a private data element of the plurality of private data elements within the database, and verify, for the at least an obfuscated data element within the set of obfuscated data elements, the first distance measure is within a distance range, wherein a minimum threshold of the distance range is determined as a function of a deidentification parameter and a maximum threshold of the distance range is determined as a function of an obfuscation parameter.

In another aspect, a method for generating obfuscated data within a computing environment is described. The method includes accessing, by at least a processor, a database containing a plurality of private data elements belonging to at least a private record, generating, by the at least a processor, a set of obfuscated data elements using an generative model as a function of the plurality of private data elements, determining, by the at least a processor, a first distance measure between at least an obfuscated data element within the set of obfuscated data elements and at least a private data element of the plurality of private data elements within the database, and verifying, for the at least an obfuscated data element within the set of obfuscated data elements, the first distance measure is within a distance range, wherein a minimum threshold of the distance range is determined as a function of a deidentification parameter and a maximum threshold of the distance range is determined as a function of an obfuscation parameter.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for generating obfuscated data that maintain data utility while ensuring compliance with privacy standards within a computing environment. In an embodiment, one or more generative machine learning models may be used to generate synthetic data that can be used as a proxy to original data. Synthetic data may include data elements transformed from sensitive data elements having less identifiable forms without losing their utility.

Aspects of the present disclosure can be used to enhance the security and confidentiality of data used in training machine learning models particularly in environments where data sensitivity is paramount. Aspects of the present disclosure can also be used to enhance the quality of training data by requiring the generated data to be both distinct from the original data the machine learning models were trained on as well as not too distinct that the generated data could be considered hallucinatory. This is so, at least in part, because the disclosed methods includes adaptive measures to tailor the obfuscation process to the data of the target domain. Exemplary embodiments illustrating aspects of the present disclosure are described below in the context of several specific examples.

Figure 1:
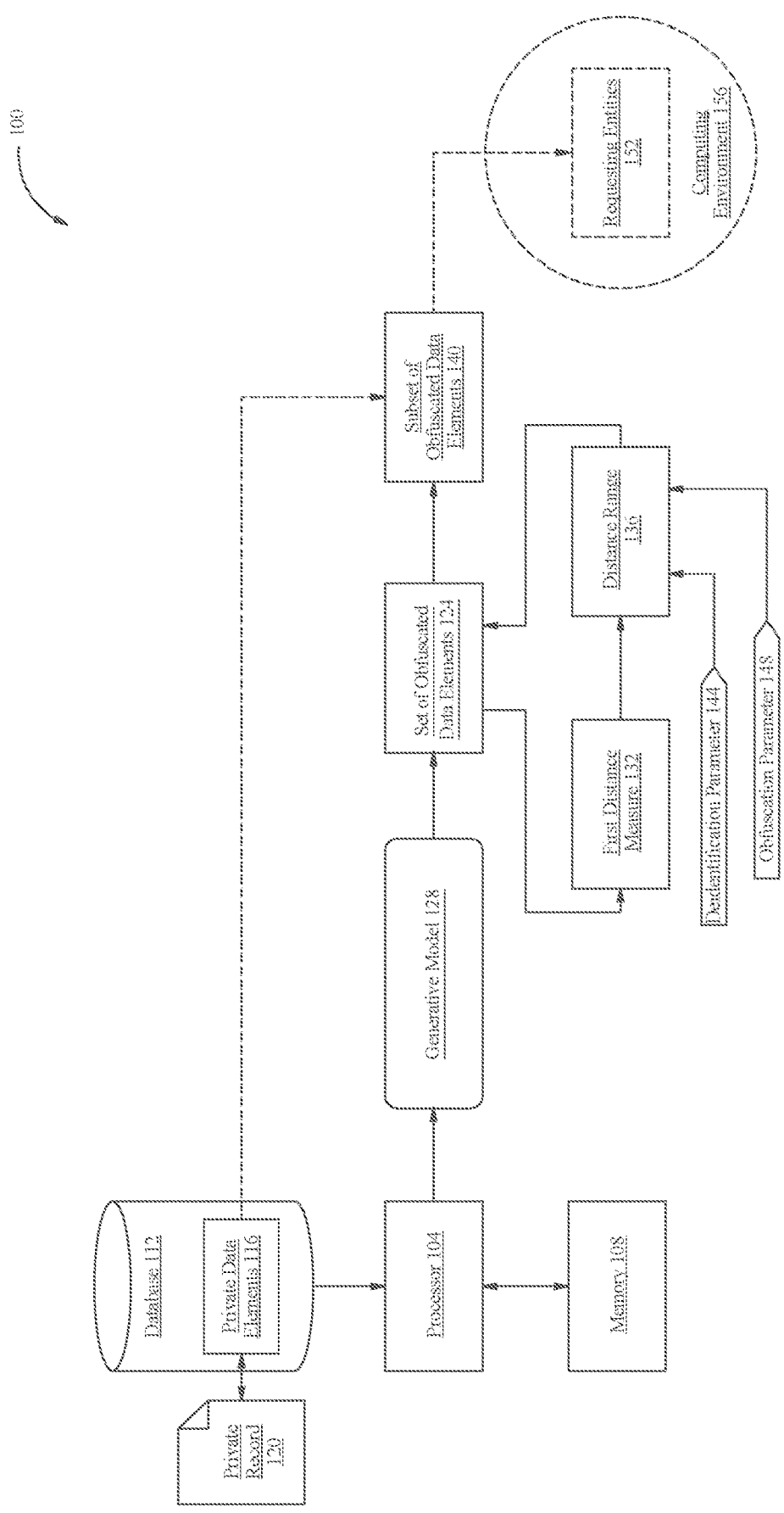
FIG. 1 illustrates an exemplary embodiment of an apparatus for generating obfuscated data within a computing environment.

Referring now to FIG. 1, an exemplary embodiment of an apparatus 100 for generating obfuscated data elements within a computing environment is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 is communicatively connected to memory 108, wherein memory 108 contains instructions configuring processor 104 to perform any processing steps as described below. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to access a database 112 containing a plurality of private data elements 116 belonging to at least a private record 120. As described herein, a "database" is a collection of data that can be accessed, managed, and updated. In one or more embodiments, database 112 may include one or more systematically organized collections of a plurality of private records as described in further detail below, interfacing with processor 104 and one or more other data storage mechanisms, which may be efficiently retrieved, updated, and/or manipulated. As a non-limiting example, database 112 as described herein may include a relational database having one or more structured formats that organize plurality of private data elements 116 into one or more tables with plurality of rows and columns. Apparatus 100 may implement one or more aspect of a database management system (DBMS), for example and without limitation, functions such as data element insertion, querying, update, delete, and administration may be implemented and performed, by processor 104, on database 112. In some embodiments, database 112 may include flexible schemas e.g., key-value stores. In some cases, processor 104 may access one or more data warehouses or data lakes or repositories that report data analytics or hold a large amount of raw data in its native format until needed. Additionally, or alternatively, database 112 may include one or more datasets or "corpora," collections of values, written texts, recorded speech, or the like, for example, and without limitation, one or more electronic health record (EHR) as described in further detail below. Other exemplary embodiments of database 112 as described herein may include, without limitation, financial transaction logs, social media content datasets, linguistic corpora, among others.

With continued reference to FIG. 1, as a non-limiting example, database 112 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records such as, without limitation, plurality of private data elements 116 as described in further detail below. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database 112 may store, retrieve, organize, and/or reflect data elements as used herein, as well as categories and/or populations of data consistently with this disclosure.

With continued reference to FIG. 1, as used in this disclosure, "data elements" is a unit of data that represent a single piece of information defined in a way that is understandable and usable. In an embodiment, data element may be an atomic unit of database 112 (e.g., dataset) or a data structure, which cannot be broken down into smaller parts without losing its meaning or value. In some cases, data elements may be numerical, textural, binary, or any other type of data that can be stored, processed, and retrieved by processor 104. In some cases, data element may include one or more data attributes, such as, without limitation, a name, a value, a data type, and/or a set of metadata that describes data element's properties, constraints, or relationships with other data elements. A "private data element," for the purpose of this disclosure, is a data element that is associated with an individual or entity that requires protection from unauthorized access or disclosure. In some cases, private data element may include any initial or original data element that is an unaltered and stored within database 112 before any processing, transformation, or obfuscation as described herein has been applied. A "private record," as used herein, is a collection of private data elements as described above. In one or more embodiments, plurality of private data elements may include raw, authentic data collected from one or more private records e.g., EHRs, financial transaction logs, user behavior data, sensor data, PII, among others. As a non-limiting example, plurality of private data elements 116 may include sensitive information, regulated data, and/ or any data under access control. In some cases, plurality of private data elements may be subject of obfuscation as described herein to protect sensitive information from unauthorized access while still allowing for meaningful use (e.g., predictive modeling to improve patient outcomes, financial risk assessment, and/or the like) of the data in aggregated or anonymized form.

With continued reference to FIG. 1, in some cases, each private data element of plurality of private data elements 116 and/or at least a private record 120 may be represented as a vector. In these cases, database 112 containing plurality of private data elements 116, such as, without limitation, a corpus, may be represented as a vector space. A "vector," as defined in this disclosure, is a data structure that represents one or more a quantitative values and/or measures of a given data element. A vector may be represented as an n-tuple of values, where n is one or more values, as described in further detail below. A "vector space," as defined in his disclosure, is a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. In some cases, each dimension may correspond to a feature of the data. In some cases, at least a private record 120 such as, without limitation, a patient's health record may describe one or more data fields (i.e., plurality of private data elements 116) such as, without limitation, age, weight, blood pressure readings, cholesterol level, and the like.

With continued reference to FIG. 1, in an embodiment, database 112 may include a collection of vectors as described above. As a non-limiting example, database 112 may include a plurality of text documents, wherein each document of the plurality of text documents may be transformed into a vector using TF-IDF or word embeddings. In some cases, each dimension in each vector may represent, for example, a significance of a word or phrase within the corresponding document in the context of the entire database 112. In some cases, two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes. Processor 104 may be configured to perform searching, classification, topic modeling, content generation, and/or the like on such text data stored in database 112.

With continued reference to FIG. 1, in one or more embodiments, processor 104 may perform determinations, classification, and/or analysis steps, methods, processes, or the like as described in this disclosure using machine-learning processes trained on database 112. A "machine-learning process," as used in this disclosure, is a process that automatedly uses a body of data known as "training data" and/or a "training set" to generate an algorithm that will be performed by a processor 104/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below. As a non-limiting example, one or more machine learning models as described in further detail below may be trained on plurality of private data elements 116 within database 112. For instance, a neural network may be trained on plurality of private data elements containing medical imaging data with labels, learn and predict health-related outcomes e.g., presence of diseases or the effectiveness of certain treatments.

With continued reference to FIG. 1, processor 104 is configured to generate a set of obfuscated data elements 124, representative of at least a private record 120, as a function of plurality of private data elements 116. As used in this disclosure, "obfuscated data elements" are data elements that have been intentionally modified or transformed from its original state while still preserving a pre-determined level of utility that allows for specific uses of the data elements. In some cases, plurality of private data elements 116 may be transformed into a plurality of obfuscated data elements to prevent unauthorized access to, or disclosure of sensitive information; for instance, and without limitation, each obfuscated data element may no longer directly or indirectly reveal sensitive details but may still support processor 104 to perform data analysis, testing, or other operational processes as described herein without compromising its confidentiality. As another non-limiting example, obfuscated data element may include a synthetic data element. In some cases, set of obfuscated data elements may include one or more preliminary obfuscated data elements, wherein the "preliminary obfuscated data elements," for the purpose of this disclosure, are initial or general obfuscated data elements that have been processed or transformed from their original state to a modified state but require further refinement, evaluation, and/or adjustment to meet pre-defined privacy, security, or utility criteria before considered as "finalized obfuscated data elements" as described further below. In one or more embodiments, obfuscated data may be generated through one or more methods of distortion, encryption, or other transformation techniques as described below to make plurality of private data elements 116 within database 112 unintelligible and/or unattributable to specific individuals or entities without losing data's utility for certain applications or analyses, such as, without limitation, machine learning model training, data analytics, secure data sharing, and/or the like. Exemplary obfuscated data elements may include, without limitation, encrypted email content, masked customer records, generated medical data, anonymized survey data, tokenized payment transactions, and the like.

With continued reference to FIG. 1, as a non-limiting example, obfuscated data elements may include data elements describing generic placeholders or tokens, pseudonyms, presumptions, or hypothesis, and/or the like. In some cases, generating set of obfuscated data elements 124 may include replacing one or more private identifiers (i.e., specific pieces of information that can directly or indirectly identify an individual, such as names, social security numbers, addresses, email addresses, and/or the like) with one or more pseudonyms or placeholders. Data subsequent to such replacement may be matched with plurality of private data elements 116 without revealing actual source identity. In some cases, plurality of obfuscated data elements may be reversible with additional information, for example, and without limitation, through the use of a secure mapping database that may be configured to store relationships between the pseudonyms and the private data elements. In some cases, plurality of private data elements 116 within database 112 may be hidden with one or more altered values. In an embodiment, processor 104 may statically mask one or more private data elements of plurality of private data elements in database 112 by permanently substituting the one or more private data elements with masked version data elements before plurality of private data elements leaves the server or database 112 or before it is used in a less secure applications or testing computing environment. In another embodiment, processor may temporarily mask one or more private data elements of plurality of private data elements in real-time during access or query operations. As a non-limiting example, when a request to view or process plurality of private data elements 116 is made, sensitive information may be automatically masked to the user based on the user's access level, wherein plurality of private data elements may remain intact and unaltered within database 112.

With continued reference to FIG. 1, in some cases, one or more "tokens" or "placeholders" (i.e., non-sensitive equivalent) may be generated by processor 104 to replace sensitive elements within each private data element of plurality of private data elements 116 using a secure tokenization module. As used in this disclosure, a "secure tokenization module" is a specialized component or piece of software designed to systematically convert sensitive data elements into a non-sensitive representation, referred to as tokens, which have no exploitable value or meaning outside the system. In one or more embodiments, secure tokenization module may map tokens or placeholders within one or more obfuscated data elements back to the original data through secure tokenization module. In one or more embodiments, secure tokenization module may be configured to securely remove specific data elements or part of data element e.g., identifying details to prevent obfuscated data element from being traced back to one or more individuals. For example, K-anonymity may be implemented, where private data elements may be modified until each private data element is indistinguishable from at least k-1 other data elements in database 112. In some cases, generating set of obfuscated data elements may include aggregating plurality of private data elements 116, where individual private data element may be summarized into one or more larger groups of data elements using secure tokenization module.

With continued reference to FIG. 1, as a non-limiting example, a private data element e.g., a sequence of social security numbers associated with a customer within database 112 may be replaced, by secure tokenization module, with a series of "X's" or a random set of numbers, effectively obscuring the private data element. Such replacement may be permanent, meaning private data element may never be displayed to developers or testers. As another non-limiting example, when dynamic masking is applied, user, such as a healthcare professional, may query database 112; secure tokenization module may automatically obscure patient names and other patient identifiers without the necessary clearance, while allowing access to unmasked private data elements for authorized users such as attending physicians or medical researchers with specific access rights. Additionally, or alternatively, generating plurality of obfuscated data elements 124 may include shuffling, or rearranging values in a dataset or each private data element of plurality of private data elements 116 such that the values may be disconnected from plurality of private data elements 116. Further, secure tokenization module may be configured to add a pre-defined amount of random noise to plurality of private data elements 116 through noise addition or differential privacy as described in further detail below. As a non-limiting example, plurality of private data elements 116 may be altered while overall statistical properties of the database 112 may be maintained. Secure tokenization module may add a random value, for example, and without limitation, within a range of −2 or +2 years to each age entry within database 112. In this case, aggregate statistical analysis such as average age of the population, age distribution, and/or the like may remain accurate.

With continued reference to FIG. 1, in some cases, private data elements 116 may be encrypted using one or more cryptographic algorithms in order to generate one or more obfuscated data elements, wherein processor 104 may implement one or more cryptographic algorithms to render private data elements 116 unreadable without corresponding decryption key. In an embodiment, methods, and apparatus 100 described herein may perform or implement one or more aspects of a cryptographic system. A "cryptographic system," for the purpose of this disclosure, is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption". The decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, in embodiments of cryptographic systems that are "asymmetric," either encryption or decryption key cannot be readily deduced without additional secret knowledge, even given the possession of a corresponding decryption or encryption key, respectively; an example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some cases, at least an obfuscated data element within set of obfuscated data elements 124 may include a cryptographic hash. In some embodiments, apparatus 100, and methods described herein may produce one or more cryptographic hashes, also referred to by the equivalent shorthand term "hashes." A cryptographic hash, as used herein, is a mathematical representation of a lot of data, such as database 112 or plurality of private data elements 116 as described in further detail below; the mathematical representation is produced by a lossy "one-way" algorithm known as a "hashing algorithm." Hashing algorithm may be a repeatable process; that is, identical lots of data May produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

With continued reference to FIG. 1, in an embodiment, hashing algorithm may demonstrate an "avalanche effect," whereby even extremely small changes to a data element may produce drastically different hashes. This may thwart attempts to avoid the computational work necessary to recreate a hash by simply inserting a fraudulent datum in data element, enabling the use of hashing algorithms for "tamper-proofing" data such as plurality of private data elements contained in database 112 as described above. This avalanche or "cascade" effect may be evinced by various hashing processes; persons skilled in the art, upon reading the entirety of this disclosure, will be aware of various suitable hashing algorithms for purposes described herein. Verification of a hash corresponding to plurality of private data elements 116 may be performed by running plurality of private data elements 116 through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to a private data element to be hashed will change the resulting hash so extensively that the original hash and the new hash appear uncorrelated to each other. A degree of security of a hash function in practice may depend both on the hash function itself and on characteristics of the private data element and/or digest used in the hash function. For example, where a data element is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible data elements may be augmented by increasing the length or potential length of a possible data element, or by implementing a protocol whereby one or more randomly selected strings or sets of data are added to the data element, rendering a dictionary attack significantly less effective.

With continued reference to FIG. 1, generating set of obfuscated data elements 124 may include sampling from a noise distribution on a deidentified version of the plurality of private data elements 116. As used in this disclosure, a "noise distribution" is a mathematical model that defines how random variations i.e., "noise," are distributed or spread across a range of values. Processor 104 may sample from a noise distraction to introduce certain degree of variability into plurality of private data elements 116 according to one or more properties of the chosen distribution, such as, without limitation, Gaussian (normal), uniform, Laplacian distributions, and/or the like. In some cases, noise distribution may determine an extent of randomness added to plurality of private data elements 116 within database 112. A "deidentified version" of private data element, for the purpose of this disclosure, is an (original) data element from which at least a part of the data element has been intentionally removed or altered to prevent identification of individuals. In one embodiment, deidentified version of a private data element may include a private data element from which PII (e.g., names, social security numbers, addresses, and other direct or indirect identifiers) of a corresponding individual has been removed to hinder subsequent re-identification.

With continued reference to FIG. 1, in one or more embodiments, processor 104 may be configured to apply a gaussian noise, uniform noise, Laplacian noise, and/or the like to one or more numerical or textural values in plurality of private data elements in a deidentified medical dataset to prevent an inference of specific patient information from biometric or health measurements. As a non-limiting example, database 112 may include a deidentified healthcare dataset containing information such as patient ages, diagnosis codes, treatment outcomes, among others but with all direct identifiers removed. Processor 104 may generate a set of obfuscated data elements 124 by sample from a gaussian noise distribution and add the sampled noise to private data elements describing the ages and treatment outcome values. For instance, and without limitation, if the original age of a patient is 45, adding gaussian noise with a mean of 0 and a standard deviation of 3 may alter the age to 48 in set of obfuscated data elements 124.

With continued reference to FIG. 1, processor 104 is configured to generate, using a generative model 128, set of obfuscated data elements 124 as a function of plurality of private data elements 116. As used in this disclosure, a "generative model" is a computational model designed to automatically generate obfuscated data elements as described herein. In an embodiment, generative model 128 may include a generative machine learning model as described in further detail below with reference to FIG. 4. In some cases, generative model 128 may implement one or more aspects of "generative artificial intelligence (AI)," a type of AI that uses machine learning algorithms to create, establish, or otherwise generate data such as, without limitation, obfuscated data elements in various data modalities (e.g., text, image, video, audio, among others) that is similar to one or more provided training examples. In an embodiment, machine learning module described herein may generate one or more generative machine learning models that are trained on plurality of private data elements 116 within database 112. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

With continued reference to FIG. 1, in some cases, generative machine learning models may include one or more generative models. In one embodiment, generative models may include statistical models of the joint probability distribution P(X,Y) on a given observable variable x, representing features or data that can be directly measured or observed (e.g., private data elements) and target variable y, representing the outcomes or labels that one or more generative models aims to predict or generate (e.g., obfuscated data elements). In some cases, generative models may rely on Bayes theorem to find joint probability; for instance, and without limitation, Naïve Bayes classifiers may be employed by generative model 128 to categorize input data such as, without limitation, plurality of private data elements into different classes such as, without limitation, "sensitive" and "non-sensitive," or "high risk," "medium risk," and "low risk" based on the degree of sensitivity or privacy risk associated with plurality of private data elements 116.

With continued reference to FIG. 1, in a non-limiting example, and still referring to FIG. 1, one or more generative machine learning models may include one or more Naïve Bayes classifiers generated, by processor 104, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction.

With continued reference to FIG. 1, although Naïve Bayes classifier may be primarily known as a probabilistic classification algorithm; however, it may also be considered a generative model described herein due to its capability of modeling the joint probability distribution $P(X,Y)$ over observable variables X and target variable Y. In an embodiment, Naïve Bayes classifier may be configured to make an assumption that the features X are conditionally independent given class label Y, allowing generative model to estimate the joint distribution as $P(X,Y)=P(Y)\Pi_i P(X_i|Y)$, wherein $P(Y)$ may be the prior probability of the class, and $P(X_i|Y)$ is the conditional probability of each feature given the class. One or more generative machine learning models containing Naïve Bayes classifiers may be trained on labeled training data, estimating conditional probabilities $P(X_i|Y)$ and prior probabilities $P(Y)$ for each class; for instance, and without limitation, using techniques such as Maximum Likelihood Estimation (MLE). One or more generative machine learning models containing Naïve Bayes classifiers may select a class label y according to prior distribution $P(Y)$, and for each feature $X_i$, sample at least a value according to conditional distribution $P(X_i|y)$. Sampled feature values may then be combined to form one or more new data instance with selected class label y. In a non-limiting example, one or more generative machine learning models may include one or more Naïve Bayes classifiers to generate obfuscated data elements based on "sensitive" and "non-sensitive," or "high risk," "medium risk," and "low risk" associated with plurality of private data elements 116, wherein the generative machine learning models may be trained on database 112.

With continued reference to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data (i.e., private data elements) from the hypothetical data (i.e., obfuscated data elements). In some cases, generator may learn to make discriminator classify its output as "original." In an embodiment, discriminator may include a supervised machine learning model while generator may include an unsupervised machine learning model as described in further detail with reference to FIG. 4.

With continued reference to FIG. 1, in an embodiment, discriminator may include one or more discriminative models, i.e., models of conditional probability $P(Y|X=x)$ of target variable Y, given observed variable X. In an embodiment, discriminative models may learn boundaries between classes or labels in given training data. In a non-limiting example, discriminator may include one or more classifiers as described in further detail below with reference to FIG. 4 to distinguish between different categories e.g., "original" vs. "new", or states e.g., "TRUE" vs. "FALSE" within the context of generated data such as, without limitations, set of obfuscated data elements 124. In some cases, computing device may implement one or more classification algorithms such as, without limitation, Support Vector Machines (SVM), Logistic Regression, Decision Trees, and/or the like to define decision boundaries. In a non-limiting example, generator of GAN may be responsible for creating synthetic data elements that resembles private data element. In some cases, GAN may be configured to receive an input, such as, without limitation, random noise vectors, text descriptions, conditioned data such as labels or attributes, as input and generates corresponding synthetic images, audio, textural content, and/or the like. Such iterative process of generation and discrimination may continue until generator produces data elements that is indistinguishable from private data elements to the discriminator.

With continued reference to FIG. 1, additionally, or alternatively, generative model 128 may include a conditional GAN as an extension of the basic GAN as described above that allows for generation of set of obfuscated data elements 124 based on certain pre-determined conditions or labels. As a non-limiting example, in standard GAN, generator may produce obfuscated data elements from random noise as described above, while in a conditional GAN, generator may produce obfuscated data elements based on random noise and a given condition or label.

With continued reference to FIG. 1, Other exemplary embodiment of generative model 128 may include, without limitation, a large language model (LLM) for textural data generation, an autoencoder for dimensionality reduction and feature learning, a diffusion model for generating image or audio data, and/or the like. As a person skilled in the art, upon reviewing the entirety of this disclosure, will be aware of various generative model may be employed by processor 104 as described herein to accommodate different data modalities, allowing tailored generation of obfuscated data elements that maintain the essence and utility of the private data elements while ensuring privacy and compliance with data protection standards. As a non-limiting example, one or more LLMs as described in further detail below may be used to create synthetic textual evidence in response to user quires. In one embodiment, LLMs may include one or more autoregressive LLMs configured to learn the probability distribution of a token sequence (plurality of private data elements 116) and generating each subsequent token (i.e., obfuscated data element) based on the preceding context; for instance, and without limitation, one or more autoregressive LLMs may be implemented, by processor 104, as generative model 128 to generate obfuscated versions of sensitive documents where the content (i.e., private data elements) is similar in theme and relevance but sufficiently altered. In some cases, autoregressive LLMs may implement differential privacy during the model training to add randomness to the learning process. In other cases, autoencoder may be used to reconstruct less identifiable version of private data element. Additionally, or alternatively, diffusion models may be used to generate realistic yet non-identifiable images or audios. In one or more embodiments, processor 104 may be configured to select the appropriate model based on the data modality of plurality of private data elements 116.

With continued reference to FIG. 1, processor 104 is configured to determine a first distance measure 132 between at least an obfuscated data element within set of obfuscated data elements 124 and at least a private data element of plurality of private data elements 116 within database 112. As used in this disclosure, a "distance measure" is a quantitative metric used to assess the degree of similarity or dissimilarity between two data elements or groups of data elements. In some cases, first distance measure 132 may possess one or more properties of a metric space such as, without limitation, non-negativity, identity of indiscernible, symmetry, triangle inequality, and/or the like ensuring distance measure provide a consistent and reliable way to quantity similarity or difference. As a non-limiting example, distance measure may include a Euclidean distance i.e., a straight-line distance between two points in Euclidean space. As another non-limiting example, cosine similarity (i.e., measure of an angle between two vectors) may be used to measure a distance between at least an obfuscated data element within set of obfuscated data elements 124 and at least a private data element of plurality of private data elements 116. In one embodiment, cosine similarity may be computed as a function of using a dot product of the two vectors divided by the lengths of the two vectors, or the dot product of two normalized vectors. For instance, and without limitation, a cosine of 0° is 1, wherein it is less than 1 for any angle in the interval (0,π) radians. Cosine similarity may be a judgment of orientation and not magnitude, wherein two vectors with the same orientation have a cosine similarity of 1, two vectors oriented at 90° relative to each other have a similarity of 0, and two vectors diametrically opposed have a similarity of −1, independent of their magnitude. As a non-limiting example, vectors may be considered similar if parallel to one another. As a further non-limiting example, vectors may be considered dissimilar if orthogonal to one another. As a further non-limiting example, vectors may be considered uncorrelated if opposite to one another. Additionally, or alternatively, degree of similarity may include any other geometric measure of distance between vectors.

With continued reference to FIG. 1, as a non-limiting example, a distance measure between an obfuscated "age" attribute of 34 years and an original "age" attribute of 30 years may be 4 years (in this cases, the distance measure may be an absolute difference). For obfuscation process, as described in further detail below, processor 104 may determine that any first distance measure of at least 3 years may be sufficient to obscure the original age. Other exemplary distance measure may include, without limitation, hamming distance, Jaccard index, and/or the like. As persons skilled in the art, upon reviewing the entirety of this disclosure, will be aware of various distance measure may be employed to ensure that the generated obfuscated data element is substantially different from the private data element. It should be noted that, the choice of first distance measure 132 and threshold for sufficient obfuscation as described herein may vary, depending on the nature of data elements, privacy requirements of database 112, and/or the specific application or analysis for which the obfuscated data elements are intended.

With continued reference to FIG. 1, processor 104 may be configured to generate a set of finalized obfuscated data elements. As used in this disclosure, "finalized obfuscated data elements" are end product of data obfuscation as described herein where plurality of private data elements have undergone one or more transformations to conceal or alter the value of the data elements subsequent to refinement, evaluation, and/or adjustment that satisfying pre-defined privacy, security, or utility criteria. In one embodiment, set of finalized obfuscated data elements may be analytically-ready, operationally-ready, and/or research-ready. In some cases, set of finalized obfuscated data elements may comply with data protection regulations and standards such as, without limitation, GDPR, HIPAA, or CCPA which mandate the protection of personal and sensitive data. As a non-limiting example, set of finalized obfuscated data elements may be irreversible without specific keys or additional information. Plurality of private data elements 116 may not be reconstructed from set of finalized obfuscated data elements without substantial effort. Set of finalized obfuscated data elements may include any obfuscated data elements within set of obfuscated data elements 124 as described above with, or without any adjustments and/or modifications.

With continued reference to FIG. 1, processor 104 is configured to verify, for at least an obfuscated data element within set of obfuscated data elements 124, first distance measure 132 is within a distance range 136. Processor 104 may be configured to select a subset of obfuscated data elements 140 from set of obfuscated data elements 124 as a function of the verification and transmit the selected subset of obfuscated data elements to one or more requesting entities within a computing environment as described in further detail below. As used in this disclosure, a "distance range" is a specified range of values that sets boundaries within which an obfuscated data element deviate from private data element (i.e., the degree of alteration or obfuscation of data element from its original form) is considered acceptable. In some cases, distance range 136 as described herein may be based on one or more pre-defined requirements or criteria for obfuscation and user's need to balance privacy protection with the utility of the obfuscated data elements.

With continued reference to FIG. 1, distance range 136 includes a minimum threshold and a maximum threshold. As a non-limiting example, verifying first distance measure 132 against distance range 136 may include verifying first distance measure 132 is greater than minimum threshold e.g., a minimum distance $D_{min}$, and is less than a maximum threshold e.g., a maximum distance $D_{max}$, from at least a pre-determined number M of private data elements of plurality of private data elements 116. In one embodiment, $D_{min}$ may ensure obfuscated data elements are substantially different from private data elements while $D_{max}$ may ensure obfuscated data elements do not deviate too much from private data elements thereby preserving the utility for further processing steps as described below. In some cases, user may manually determine M, the parameter that specify a desired number of private data elements that should fall within distance range 136 as described herein; for instance, and without limitation, user may input a minimum number of private data elements that should fall within $D_{max}$ threshold to an obfuscated data element to set a desired level of similarity across database 112 for analytical consistency. Processor 104 may be configured to evaluate, at least an obfuscated data element within set of obfuscated data elements 124 to check, based on corresponding first distance measure, its modified state falls within distance range 136 from its original state indicated by the corresponding private data element.

With continued reference to FIG. 1, in one or more embodiments, verifying first distance measure 132 is within distance range 136 may include assessing a similarity or dissimilarity of at least an obfuscated data element is within distance range i.e., $D_{min}$ to $D_{max}$. In such embodiments, processor 104 may verify at least an obfuscated data element within set of obfuscated data elements 124 is neither too similar (e.g., risking privacy) nor too dissimilar (e.g., risking utility) from at least a private data element of plurality of private data elements 116 within database 112. Processor 104 may select one or more obfuscated data elements i.e., "subset of obfuscated data elements" that meet the above criteria set by distance range 136. Each obfuscated data elements within sub set of obfuscated data elements 124 may have first distance measure falls within distance range 136. In some cases, selecting one or more obfuscated data elements may include, without limitation, aggregating similar obfuscated data elements (having smaller first distance measures), further noise addition, threshold/distance range adjustment (e.g., fine-tuning the thresholds based on one or more user feedbacks), data elements re-evaluation, synthetic data generation (for example, for data elements that still pose a risk of revealing sensitive information or do not meet the criteria), encryption, anonymity checks (e.g., k-anonymity, l-diversity, or t-closeness checks on sub set of obfuscated data elements 124), and/or the like.

With continued reference to FIG. 1, as a non-limiting example, database 112 may include plurality of private data elements 116 having complex data modalities such as images, audios, videos, or any other high-dimensional and detailed data types. In some cases, plurality of private data elements 116 may include one or more high-resolution medical images, such as, without limitation, X-rays, MRIs, or CT scans which contain detailed anatomical information that may be considered sensitive due to the potential for identifying the related patients from unique anatomical features or through image associated metadata. Generative model 128 as described above may include a conditional GAN (i.e., an extension of GAN model capable of receiving one or more additional conditioning inputs such as the deidentification parameter and obfuscation parameter as described in further detail below), trained on database 112 to generate, for example, without limitation, synthetic images, audios, videos, or the like that resemble plurality of private data elements 116 in terms of anatomical structures and pathological features relevant to patients and their medical diagnoses. For example, and as described above, generator may create new images while the discriminator may evaluate the created images against real images stored in database 112, refining generative model 128 until the synthetic data are indistinguishable from original ones to the untrained eye, yet do not correspond to any private data elements of plurality of private data elements 116 within database 112.

With continued reference to FIG. 1, verifying first distance measure 132 includes determining minimum threshold of distance range 136 as a function of a deidentification parameter 144 and determining maximum threshold of distance range 136 as a function of an obfuscation parameter 148. As used in this disclosure, a "deidentification parameter" is a quantitative or qualitative criterion used to guide the removing or modifying process of private data elements (e.g., personal identifiers) to prevent the identification of individuals. In some cases, deidentification parameter 144 may include specific rule or thresholds for altering data, such as, without limitation, level of generalization, suppression noise addition required, privacy protection level, and/or the like. As a non-limiting example, deidentification parameter may specify all private data elements associated with direct identifiers (e.g., names, SSN, and the like) within plurality of private data elements 124 be removed and all private data elements associated with quasi-identifiers (e.g., zip codes, dates of birth, and the like) within plurality of private data elements 124 be aggregated or partially suppressed. An "obfuscation parameter," for the purpose of this disclosure, is a degree or manner in which private data elements are transformed or disguised to conceal its original state. In one embodiment, obfuscation parameter 148 may determine one or more maximum allowable changes to private data element to maintain the desired utility for its intended application subsequent to the obfuscation as described herein. In some cases, obfuscation parameter 148 may include a specification or an implementation of obfuscation algorithms to be applied (e.g., data masking, pseudonymization, synthetic data generation, and/or the like) and the extent to which these algorithms should alter plurality of private data elements 124.

With continued reference to FIG. 1, As a non-limiting example, minimum threshold $D_{min}$ (and potentially maximum threshold $D_{max}$) may be determined based on a privacy protection level (i.e., deidentification parameter 144) associated with at least one pre-determined domain. As used in this disclosure, a "privacy protection level" is a degree of confidentiality and security applied to prevent private data element or one or more parts of the private data element from unauthorized access or disclosure. In some cases, privacy protection level may be determined by assessing the sensitivity of private data elements, potential impact of private data elements exposure on individuals or entities, trusted regulatory or policy requirements, and/or the like. As a non-limiting example, privacy protection levels may be categorized into different tiers or classifications with each level indicating a strictness of privacy controls and measures that need to be implemented. A "pre-determined domain," for the purpose of this disclosure, is specific field, sector, or otherwise context for which original and/or obfuscated data elements are collected, stored, and/or processed as described herein. In some cases, each domain may have a distinct data types, privacy concerns, regulatory requirements, operational needs, and/or the like that affect how data elements are handled. Exemplary domains may include, without limitation, healthcare, finance, education, government, and/or the like.

With continued reference to FIG. 1, in some cases, a higher privacy protection level may necessitate a greater distance (e.g., greater minimum threshold $D_{min}$ and maximum threshold $D_{max}$ of distance range 136) between at least an obfuscated data element within set of obfuscated data elements 124 and at least a private data element of plurality of private data elements 116 within database 112 in order to reduce or minimize the risk of re-identification or data misuse. As a non-limiting example, in "healthcare" domain, privacy protection level may be determined based on the sensitivity of personal health information (PHI), wherein $D_{min}$ may be set higher than in, for example, "retail" domain due to the direct and indirect consequences of PHI exposure may be more significant (possibly leading to discrimination or personal distress), and wherein $D_{max}$ may be calibrated accordingly to ensure that sub set of obfuscated data elements 124 remain useful for clinical research or patient care analytics. As another non-limiting example, financial data elements may also require high privacy protection level to prevent fraud and protect user's financial integrity. Distance range 136, in this case, may be determined based privacy protection level defined by GDPR or CCPA. It should be noted, different domains may require different process to select and set the thresholds due to the varying implications of data exposure, sensitivity of data involved, specific regulatory requirements, and/or the like. As persons skilled in the art, upon reviewing the entirety of this disclosure, will be aware of different strategies of balancing privacy protection with the need for data utility to adapt the thresholds of the distance range.

With continued reference to FIG. 1, as another non-limiting example, maximum threshold $D_{max}$ and pre-determined number M of private data elements of plurality of private data elements may be determined based on an obfuscation risk tolerance level (i.e., obfuscation parameter 148). As used in this disclosure, an "obfuscation risk tolerance level" is a degree of risk an entity (e.g., organization) is willing to accept in relation to potential re-identification of users within sub set of obfuscated data elements 124. In some cases, obfuscation risk tolerance level may vary across different domains listed above and entities. As a non-limiting example, obfuscation risk tolerance level may be categorized into "low," "medium," and "high," each indicating an aggressiveness of obfuscation process as described herein to be applied. In some cases, "healthcare" domain may exhibit a "low" obfuscation risk tolerance level due to the highly sensitive nature of PHI as described above and HIPAA requirements (e.g., breaches may have substantial negative consequences for patient privacy and organizational liability). Conversely, "education" domain may have a relatively lower obfuscation risk tolerance level. While student data privacy is important, the direct consequences of data breaches may be perceived as less severe than in "healthcare" or "finance" domain. As a non-limiting example, M may be automatically determined, by processor 104, based on a pre-determined obfuscation risk tolerance level. In some cases, a lower risk tolerance may result in a large M indicating a broader representation of database 112, while a higher risk tolerance level may allow for a smaller M indicating a narrower representation of database 112. For instance, and without limitation, one or more machine learning models as described herein may be used to predict or dynamically adjust, privacy protection level, obfuscation risk tolerance level, M, and any additional inputs necessitate in selecting sub set of obfuscated data elements 140 as described herein.

With continued reference to FIG. 1, additionally, or alternatively, database 112 may include one or more patient audio records such as, without limitation, verbal descriptions of symptoms or patient-doctor consultations. In some cases, patient audio records may be received from a dialog agent as described in further detail below, wherein such patient audio records may include records of chat history between patients and medical professionals. In some cases, generating set of obfuscated data elements 124 may include applying voice conversion techniques to alter patient's voice in the audio records, replacing it with a synthetic voice, generated using generative model 128 that maintains the linguistic content but removes the identifiable voice characteristics and/or add relative context. As a non-limiting example, generative model 128 may implement one or more text-to-speech (TTS) systems coupled with a language processing module to convert private data elements, process textural information to remove or alter sensitive information, and utilize TTS to generate synthetic audio from the processed textural information.

With continued reference to FIG. 1, in one embodiment, Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations. Alternatively, or additionally, language processing module may be produced using one or more large language models (LLMs) as described in further detail below.

With continued reference to FIG. 1, language processing module may use database 112 e.g., a corpus of documents to generate associations between language elements, and diagnostic engine may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, in one or more embodiments, generative model 128 may include a combination of one or more (conditional) diffusion models for obfuscating data elements with various data modalities. As a non-limiting example, one or more diffusion models may be trained on database 112 containing one or more original images and generate new images by sampling from a noise distribution through a forward process (i.e., diffusion), wherein new images may be sufficiently distinct from training data as measured by first distance measure 132 and the constraint ($D_{min}$, $D_{max}$, M) as described above. In some cases, diffusion models may include a U-net based diffusion model having a model architecture primarily constructed from convolutional neural networks (convents) as described in further detail below. In some cases, U-net based diffusion model may be characterized by a distinctive "U" shape which includes a plurality of convolution layers (containing up-convolutions), pooling layers, dropout layers, and/or the like. U-net based diffusion model is designed for efficient processing of image-type data elements, capturing both high-level and low-level (detailed) features within images. This is so, at least in part, because of U-net based diffusion model includes a symmetric expansive path which enable localization combined with a contracting path that captures the context of data elements. In some cases, a noisy image may be input into U-net base diffusion model, wherein the noisy image may be progressively refined to generate an output that is similar to the original data in structure and appearance but altered enough to ensure the deidentification adhering to the specified constraint ($D_{min}$, $D_{max}$, M).

With continued reference to FIG. 1, in some cases, one or more diffusion models may be pre-trained models; for instance, and without limitation, one or more diffusion models may include a transformer-based diffusion model. One or more diffusion models may, in some cases, implement a transformer architecture which use self-attention mechanisms as described in further detail below to process, for example, audiovisual data for one or more utilities as described herein that require understanding complex patterns and relationships between plurality of private data elements 116 in database 112. Such pre-trained models may be fine-turned based on distance range 136 to generate synthetic images, wherein the synthetic images, in this cases, may retain essential features of the original images within database 112. In other cases, processor 104 may fine-tune the generative model 128 by conditioning one or more diffusion models on a subset of private data elements selected from plurality of private data elements within database 112 corresponding to at least one target domain, wherein the subset of private data elements may include, without limitation, one or more text descriptions of the images. For example, and without limitation, specific image attributes or scenarios, such as generating training data for "healthcare" domain where accurately rendering health conditions are essential. It should be noted that, generative model 128 as described herein may be conditioned on various modalities (not just text but other data types such as environment sounds for audio or scene elements for images) without compromising on privacy or data protection standards.

With continued reference to FIG. 1, however, in practice, verifying outputs of generative model 128 e.g., set of obfuscated data elements 124 having first distance measures satisfy distance range may be challenging if database 112 size is large. Iteratively or recursively verifying, for at least an obfuscated data element within set of obfuscated data elements, first distance measure 132 is within the defined constraint $D_{min}$ (minimum distance/similarity from any private data element), $D_{max}$ (maximum distance/similarity to a set of private data elements), and M (the number of samples that should be at least as close as $D_{max}$) may be time consuming if database 112, for example, a training corpus contains substantial enough data to cause computational or storage challenges or that requires significant processing power for generative model 128 training and validation. As a non-limiting example, a large database may include hundreds of gigabytes of text data, reaching into terabytes for raw, unprocessed files, over millions images, or EHRs of millions of patients over multiple years. In one embodiment, apparatus 100, and method as described herein may address such challenge by clustering plurality of private data elements 116 within database 112 into a plurality of clusters using at least a clustering algorithm and selecting subset of obfuscated data elements 140 from set of obfuscated data elements 124 as a function of the plurality of clusters. In some cases, plurality of private data elements 116 and/or database 112 may be considered as one or more clusters.

With continued reference to FIG. 1, As a non-limiting example, at least a clustering algorithm may be implemented using a k-means clustering algorithm. A "k-means clustering algorithm" as used in this disclosure, includes cluster analysis that partitions n data elements into k clusters in which each private data element belongs to the cluster with the nearest mean. As used in this disclosure, a "cluster" is a group of data elements that are similar to each other based on certain criteria. "Cluster analysis," as used in this disclosure, includes grouping a set of data elements in way that data elements in the same group or cluster are more similar to each other than to those in other groups or clusters. In some cases, clustering plurality of private data elements 116 within database 112 into plurality of clusters may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. In some cases, cluster analysis may include hard clustering whereby each data element belongs to a cluster or not. In some cases, cluster analysis may include soft clustering or fuzzy clustering whereby each data element belongs to each cluster to a certain degree such as for example a likelihood of belonging to a cluster; for instance, and without limitation, a fuzzy clustering algorithm may be used to identify clustering of private data elements of a first type or category with private data elements of a second type or category, and vice versa. In some cases, cluster analysis may include strict partitioning clustering whereby each data element belongs to exactly one cluster. In some cases, cluster analysis may include strict partitioning clustering with outliers whereby data elements may belong to no cluster and may be considered outliers. In some cases, cluster analysis may include overlapping clustering whereby data elements may belong to more than one cluster. In some cases, cluster analysis may include hierarchical clustering whereby data elements that belong to a child cluster also belong to a parent cluster.

With continued reference to FIG. 1, processor 104 may generate a k-means clustering algorithm receiving plurality of private data elements 116 from database 112 and outputs a definite number of classified data element clusters wherein the data element clusters each contain cluster data elements. In some cases, K-means algorithm may select a specific number of groups or clusters to output, identified by a variable "k." Generating a k-means clustering algorithm includes assigning inputs containing private data elements to a "k-group" or "k-cluster" based on feature similarity e.g., first distance measure 132. In one embodiment, each cluster of plurality of clusters may include a cluster centroid and a defined radius of influence. As used in this disclosure, a "cluster centroid" is a central data element having a mean position of all data elements in cluster. A "radius of influence," for the purpose of this disclosure, is a predefined distance around a cluster centroid within which data elements are considered to be part of that cluster. As a non-limiting example, radius of influence may essentially define a boundary or the extent to which the corresponding cluster's influence extends in multidimensional space where plurality of private data elements resides.

With continued reference to FIG. 1, in some cases, cluster centroid may be an average of all data elements in the cluster calculated separately for each dimension of the data points. In some cases, cluster centroid may include a representative of the cluster's location within the vector space in which plurality of private data elements 116 exists. Cluster centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance measure between cluster data element and cluster centroid. K-means clustering algorithm may calculate mean distance measure to a centroid as a function of k value, and the location of where the rate of decrease starts to sharply shift, this may be utilized to select a k value. Centroids of k-groups or k-cluster include a collection of feature values which are utilized to classify plurality of clusters containing private data elements. K-means clustering algorithm may act to identify clusters of closely related data elements, which may be provided with categorical data such as, without limitation, patient cohort labels; this may, for instance, generate an initial set of patient cohort labels from an initial set of data elements, and may also, upon subsequent iterations, identify new clusters to be provided new labels, to which additional data elements may be classified, or to which previously clustered private data elements may be reclassified.

With continued reference to FIG. 1, generating a k-means clustering algorithm may include generating initial estimates for cluster centroid or k centroids which may be randomly generated or randomly selected from plurality of private data elements. Cluster centroids may be utilized to define one or more clusters of plurality of clusters. K-means clustering algorithm may assign unclassified private data elements to one or more cluster centroids based on first distance measure, e.g., squared Euclidean distance, by first performing a data assigned step of unclassified data elements. In some cases, K-means clustering algorithm may assign unclassified private data element to its nearest cluster centroid based on the collection of centroids $c_i$ of centroids in set C. Unclassified private data element may be assigned to a cluster based on $\text{argmin}_{c_i \in C} \text{ dist }(c_i, x)^2$, where argmin includes argument of the minimum, $c_i$ includes a collection of cluster centroids in a set C, and dist includes standard Euclidean distance. In some cases, K-means clustering module may then recompute cluster centroids by taking mean of all cluster data elements assigned to centroid's cluster. This may be calculated based on $c_i = 1/|S_i| \Sigma x_i \in S_i^{xi}$. K-means clustering algorithm may continue to repeat these calculations until a stopping criterion has been satisfied such as when cluster data elements do not change clusters, the sum of the distances have been minimized, and/or some maximum number of iterations has been reached.

With continued reference to FIG. 1, clustering plurality of private data elements 116 may include determining a second distance measure and a third distance measure, for instance, and without limitation, k-means clustering algorithm may be configured to calculate degree of similarity index values between cluster centroid and a selected obfuscated data element (i.e., second distance measure). A "degree of similarity index value" as used in this disclosure, includes a distance measurement indicating a measurement between a cluster generated by at least a clustering algorithm and a selected data element. Degree of similarity index value may indicate how close a particular data element, or a combination of data elements is to being classified by k-means algorithm to a particular cluster. In some cases, K-means clustering algorithm may evaluate the distances of the combination of data elements to the k-number of clusters output by k-means clustering algorithm. As a non-limiting example, short distances between a data element and a cluster may indicate a higher degree of similarity between the data element and the cluster while longer distances between a data element and a cluster may indicate a lower degree of similarity between the data element and the cluster.

With continued reference to FIG. 1, in one embodiment, processor 104 may be configured to identify one or more clusters of plurality of clusters and identifying, as a function of second distance measure, one or more obfuscated data elements within set of obfuscated data elements 124 that fall within distance range 136. As a non-limiting example, the first identification process may determine which clusters are most representative or relevant, while the second identification process may ensure that selected obfuscated data elements are appropriately distanced from cluster centroids of plurality of clusters based on second distance measure. In such embodiment, processor 104 may no longer verify first distance measure of at least an obfuscated data element within set of obfuscated data elements 124 is within distance range 136, but instead, verify a distance measure between each cluster centroid of plurality of clusters (much less than the number plurality of private data elements 116 within database 112) and at least an obfuscated data element within set of obfuscated data elements 124 is within distance range 136, consistent with the constraint of ($D_{min}$, $D_{max}$, M) previously defined as described above.

With continued reference to FIG. 1, and continuing the non-limiting example, such direct verification with first distance measure may have a computational complexity of O(n×p) where n is the number of obfuscated data elements and p is the number of private data elements, assuming a distance measure calculation for each pair is O(1), and may become computationally intensive as either n or p grows. However, the cluster-based verification may have a computational complexity of O(n×k) where k is the number of clusters formed from plurality of private data elements 116 and where k<<n assuming the centroid of plurality of private data elements 116 is precomputed. Therefore, at least in part, cluster-based verification may be more scalable for larger database since it reduce the number of distance measure calculations by utilizing plurality of clusters. At least a clustering algorithm may reduce the problem space from comparing every obfuscated data element to every private data element to comparing at least an obfuscated data element to a significantly smaller number of cluster centroids. In some cases, private data elements that are outside the radius of influence of any cluster may be ignored and omitted during the said selection. It should be noted that, the above-described illustration of clustering plurality of private data elements 116 using k-means clustering is included for illustrative purposes only and should not be construed as limiting potential implementation of at least a clustering algorithm; persons skilled in the art, upon reviewing the entirety of this disclosure, will be aware of various additional or alternative clustering algorithms that may be used consistently with this disclosure.

With continued reference to FIG. 1, processor 104 may be configured to transmit subset of obfuscated data elements 140 to one or more requesting entities 152 within a computing environment 156. As used in this disclosure, a "requesting entity" is any induvial, group, organization, device, system, system/device component, or application that request access to or delivery of obfuscated data elements within a specific computing environment. A "computing environment," for the purpose of this disclosure, is a configuration of hardware, software, network resources, and services required for the operation and management of one or more applications and systems. In some cases, applications and systems may include enterprise IT applications and systems which encompass a plurality of physical and virtual resources that support the flow, processing, storage, and/or analysis of data across one or more devices and platforms. As a non-limiting example, computing environment may include one or more servers, computing devices, mobile/remote devices, and network components that control data communication and connectivity between said devices such as routers, switches, wireless access points with underlying protocols and network services. In some cases, computing environment as described herein may include one or more operating systems (OS), executable application software, databases, and/or management tools that run on one or more hardware listed above. In some cases, cloud services i.e., platforms and services hosted remotely, security systems including tools and protocols designed to protect data and resources from unauthorized access, firewalls, antivirus software, encryption, and access control module may be also integrated into computing environment. Additionally, or alternatively, computing environment may include means through which users interact with computing environment such as, without limitation, graphical user interfaces (GUIs), command-line interfaces (CLIs), web interfaces, and/or the like.

With continued reference to FIG. 1, in one embodiment, computing environment 156 may include one or more hospital information systems, EHR systems, research databases, cloud-based analytics platforms, and/or the like. One or more requesting entities 152 within such computing environment may include healthcare providers (e.g., doctors, nurses), medical researchers, clinical decision support systems, dialog agents and the like. In another embodiment, computing environment 156 may include one or more banking systems, financial market analysis tools, risk management databases, fintech application platforms, and/or the like. One or more requesting entities 152 within such computing environment may include financial analysts, regulatory compliance officers, fintech developers, risk management software, and/or the like. As persons skill in the art, upon reviewing the entirety of this disclosure, will be aware of the broad applicability and adaptability of described apparatus 100 and method for generating and transmitting obfuscated data elements, and various requesting entities utilizing obfuscated data elements across various domains.

With continued reference to FIG. 1, in one or more embodiments, each requesting entity may iteratively retrieving, or listening for subset of obfuscated data elements 140 for a specific purpose such as, without limitation, data analysis, processing, decision-making, model training, research, development, or other operational needs based on different domain and the intended use of subset of obfuscated data elements 140. Transmission of subset of obfuscated data elements 140 within computing environment 156 may be accomplished via a network communication in case where processor 104 and one or more requesting entities are interconnected through a network e.g., local area network (LAN), wide area network (WAN), or even a cloud-based network. In some cases, set of finalize obfuscated data elements may be transmitted through wireless network e.g., Wi-Fi, Bluetooth, cellular networks. In some cases, subset of obfuscated data elements 140 may be transmitted over time via batch processing and/or real-time streaming; for instance, and without limitation, the transmission of subset of obfuscated data elements 140 may be done in batches at scheduled intervals or in real-time. In some cases, real-time streaming may be used for time-sensitive data elements that requires immediate action, for example, when a using is currently waiting for a response from the system. In a non-limiting example, secure data transfer protocol such as HTTPS (Hypertext Transfer Protocol Secure), FTPS (File Transfer Protocol Secure), and/or the like may be used to transmit subset of obfuscated data elements 140 to one or more requesting entities 152. Additionally, or alternatively, processor 104 may send subset of obfuscated data elements 140 through one or more application programming interfaces (APIs), which one or more requesting entities 152 may access to retrieve subset of obfuscated data elements 140. In some cases, subset of obfuscated data elements 140 may be packaged with metadata describing, for example, generation parameters used by generative model 128 for transparency.

With continued reference to FIG. 1, apparatus 100 and method as described herein may be used to generate obfuscated training data. In some cases, generating subset of obfuscated data elements 140 may include adding subset of obfuscated data elements 140 into database 112 to generate obfuscated training data for one or more requesting entities. In one or more embodiments, obfuscated training data may be used to train one or more machine learning models as described herein such as, without limitation, one or more large language model (LLMs). As a non-limiting example, one or more requesting entities 152 may include one or more dialog agent deployed on one or more customer service platforms, virtual assistants, interactive educational platforms, automated content creation tools, and/or the like (within computing environment 156), wherein the "dialog agent," for the purpose of this disclosure, are software or applications designed to engage in conversation with human users through natural language text or voice interaction. In one or more embodiments, dialog agents may be designed to simulate human-like responses and provide assistance, information, or perform specific tasks based on one or more user inputs received through user interface as described below and/or stored context of the conversation (e.g., plurality of private data elements 116 within database 112). In some cases, processor 104 may be configured to shuffle subset of obfuscated data elements 140 with plurality of private data elements 116 within database 112 in order to generate an enlarged, obfuscated training data set for one or more LLMs.

With continued reference to FIG. 1, a "large language model," as used herein, is a deep learning data structure that can recognize, summarize, translate, predict and/or generate text and other content based on knowledge gained from massive datasets. Large language model may include an autoregressive large language model. An autoregressive large language model may seek to optimize next word prediction loss. Large language models may be trained on large sets of data. Training sets may be drawn from database 112 containing plurality of private data elements 116 and/or obfuscated data elements as described above such as, as non-limiting examples, (generative) PHI, PII, emails, medical images, audios, videos, EHRs, unstructured patient data, and the like. In some embodiments, training sets may include a variety of subject matters, such as, as nonlimiting examples, medical report documents, electronic health records, entity documents, emails, user communication histories, and the like. In some embodiments, training sets of an LLM may include information from one or more external public or private databases in addition to database 112 as described herein. As a non-limiting example, training sets may include databases associated with an entity. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained on the generated obfuscated training data. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include one or more private data elements and/or obfuscated data elements related to at least one pre-determined domain. As a non-limiting example, specific training set may include generative text related to the users such as generative user specific data sufficiently close to real user data examples. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task in a specific domain. A model such as an LLM may learn by adjusting its parameters during the training process to minimize a defined loss function, which measures the difference between predicted outputs and ground truth e.g., plurality of private data elements 116 within database 112. Once a model has been generally trained, the model may then be specifically trained to fine-tune the pretrained model on task-specific data elements to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization.

With continued reference to FIG. 1, in one or more embodiments, LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, in some cases, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation. In an embodiment, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

With continued reference to FIG. 1, in some cases, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you," with "how" and "are." It is also possible that an LLM learns that words structured in this pattern are typically a question and to respond appropriately. In some embodiments, to achieve self-attention, input may be fed into three distinct fully connected neural network layers to create query, key, and value vectors. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer. In some embodiments, LLM and/or generative model 128 may be configured to identify keywords in the output. For example, set of obfuscated data elements 124 may include portions of output that are identified as keywords. In some embodiments, these keywords may be used to identify portions of output that should be displayed as highlighted portions as discussed further with respect to FIG. 3B below.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input. In some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word. Decoder may take this output and add it to the decoder inputs. Decoder may continue decoding until a token is predicted. Decoder may stop decoding once it predicts an end token. In some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with querying plurality of private data elements 116.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like. It should be noted that LLM may generate outputs in any data modalities as described herein such as, without limitation, images, audios, videos, and/or the like.

With continued reference to FIG. 1, As a non-limiting example, a healthcare organization may train one or more LLMs to assist with medical documentation. Training data (i.e., databases 112) may include a plurality of clinical notes, patient interactions, medical literature, and/or any other private data elements as described above. In some cases, apparatus 100 and method as described herein may be used to enrich LLMs' understanding of medical language and context by generate and integrate obfuscated versions of clinical notes and interactions, using generative model e.g., cGAN, into training set while protecting patient privacy. Unlike other approaches where noise is explicitly added by means to perturb the LLMs' output from original training set, apparatus 100 and method as described herein relies on a generative model's capability to create sufficiently distinct outputs, not seen during training, while at the same time ensuring the output of the generative model is sufficiently close to the original training data so as to be not too distinct to be considered hallucinatory by verifying first and/or second distance measure is within distance range 136 as described above. One or more requesting entities 152 may include any LLMs, and models as described in this disclosure.

With continued reference to FIG. 1, in some cases, processor 104 and/or computing environment 156 may further include a display device. In some cases, one or more requesting entities may include one or more display devices. As used in this disclosure, a "display device" refers to an electronic device that visually presents information to the entity. In some cases, display device may be configured to project or show visual content generated by computers, video devices, or other electronic mechanisms. In some cases, display devices may include, without limitation, a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. In one or more embodiments, transmitting subset of obfuscated data elements 140 may include displaying set of subset of obfuscated data elements 140 at display device using a visual interface. Additionally, or alternatively, processor 104 be connected to display device.

With continued reference to FIG. 1, as used in this disclosure, a "visual interface" is a digital display that presents information, options, interactive elements to users in an intuitive and visually appealing manner. In some embodiments, visual interface may include at least an interface element. As used in this disclosure, "at least an interface element" is a portion of visual interface. In a non-limiting example, at least an interface element may include, without limitation, a button, a link, a checkbox, a text entry box and/or window, a drop-down list, a slider, or any other interface element that may occur to a person skilled in the art upon reviewing the entirety of this disclosure. In some embodiments, at least an interface element may include an event handler. An "event handler," as used in this disclosure, is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, in some cases, event handler may include a cross-session state variable. As used herein, a "cross-session state variable" is a variable recording obfuscated data elements generated by processor 104 during a previous session. Such data may include, for instance, previously entered text, previous selections of one or more elements as described above, or the like. For instance, and without limitation, cross-session state variable data may represent a request (of subset of obfuscated data elements 140) a requesting entity initiated in a past session. Cross-session state variable may be saved using any suitable combination of client-side data storage on remote device and server-side data storage connected to processor 104. In some cases, subset of obfuscated data elements 140 and/or obfuscated training data may be saved wholly or in part as a "cookie" which may include data or an identification of requesting entity to prompt provision of cross-session state variable by processor 104, which may be store in a data store at the requesting entity. In some cases, cross-session state variable may include at least a prior session datum. A "prior session datum" may include any element of data that may be stored in a cross-session state variable. In an embodiment, visual interface may be configured to display the at least a prior session datum, for instance and without limitation auto-populating user query data from previous sessions. In a non-limiting example, visual interface may include set of finalized obfuscated data elements, obfuscated training data, and/or the like. Advantageously, processor 104 may store previous selections of obfuscated data elements such that requesting entity does not have to request for finalized obfuscated data elements each time.

With continued reference to FIG. 1, in a non-limiting example, visual interface may include at least an interface element, for example, an image box, wherein the image box may be configured to display subset of obfuscated data elements 140 and/or obfuscated training data generated and transmitted by processor 104 as described above. In some cases, event handler may transmit subset of obfuscated data elements 140 and/or obfuscated training data from processor 104 to one or more requesting entities 152 within computing environment 156. In a non-limiting example, subset of obfuscated data elements 140 may be hidden on visual interface. Visual interface may include one or more interface elements, for example, a button with an event handler configured to request subset of obfuscated data elements 140 and/or obfuscated training data. In other cases, one or more requesting entities 152 may be able to edit, modify, or otherwise manipulate set of finalized obfuscated data elements and/or obfuscated training data via visual interface using plurality of interface elements.

Figure 2C:
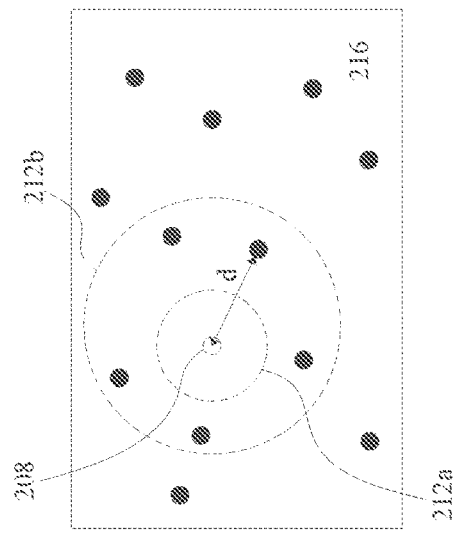
FIGS. 2A-C illustrate exemplary scenarios of a distance measure verification process.
Figure 2B:
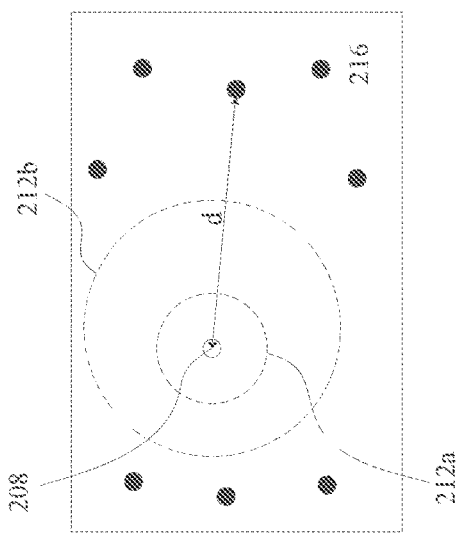
Figure 2A:
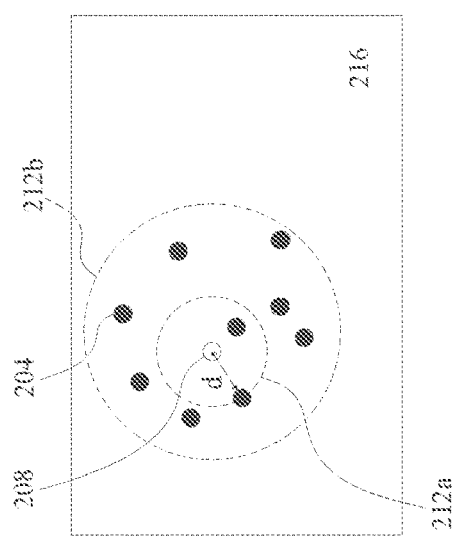

Now referring to FIGS. 2A-C, exemplary scenarios of a distance measure verification process are shown. In an embodiment, obfuscated data elements 204 (represented by black dots) may be positioned relative to at least a private data element 208 (represented by white dot) within a distance range indicated by a minimum threshold 212a (i.e., the innermost dashed circle) and a pre-determined maximum threshold 212b (i.e., the outermost dashed circle) in database 216 are illustrated. In some cases, at least a private data element 208 may include any one or plurality of private data elements within database 216. As a non-limiting example, at least a private data element 208 may include a cluster centroid of any cluster of plurality of clusters determined within database 216 as described above with reference to FIG. 1.

In one embodiment, as shown in FIG. 2A, distance measure verification process may encounter a scenario where all generated obfuscated data elements 204 are too close to the centroid (i.e., at least a private data element 208). One or more obfuscated data elements 208 fall within minimum threshold 212a (i.e., $d \leq D_{min}$). In some cases, this may occur when the system's privacy protection is inadequate, for example, and without limitation, when privacy protection level as described above with reference to FIG. 1 is low.

In another embodiment, as shown in FIG. 2B, distance measure verification process may encounter a scenario where all generated obfuscated data elements 208 fall too far from the centroid, lying outside maximum threshold (i.e., $d \geq D_{max}$). In some cases, this may occur when generated obfuscated data elements have lost substantial amount of original dataset's characteristics, potentially compromising the utility of the generated obfuscated data elements for analysis or modeling as described above with reference to FIG. 1.

In a further embodiment, as shown in FIG. 2C, a scenario where generated obfuscated training data having an optimal distribution of data elements in relation to at least a private data element 208 defined by distance range may favor the distance measure verification process and further analysis or modeling such as, without limitation, training of one or more LLMs. In such an embodiment, data elements are neither too close nor too far from the centroid and exactly M=5 data elements lie within distance range (i.e., $D_{min} \le d \le D_{max}$), suggesting that obfuscated data elements may be sufficiently distanced from the centroid to be distinguishable from private data elements while still being representative (or related) enough for analytical utility as described above with reference to FIG. 1.

Figure 3A:
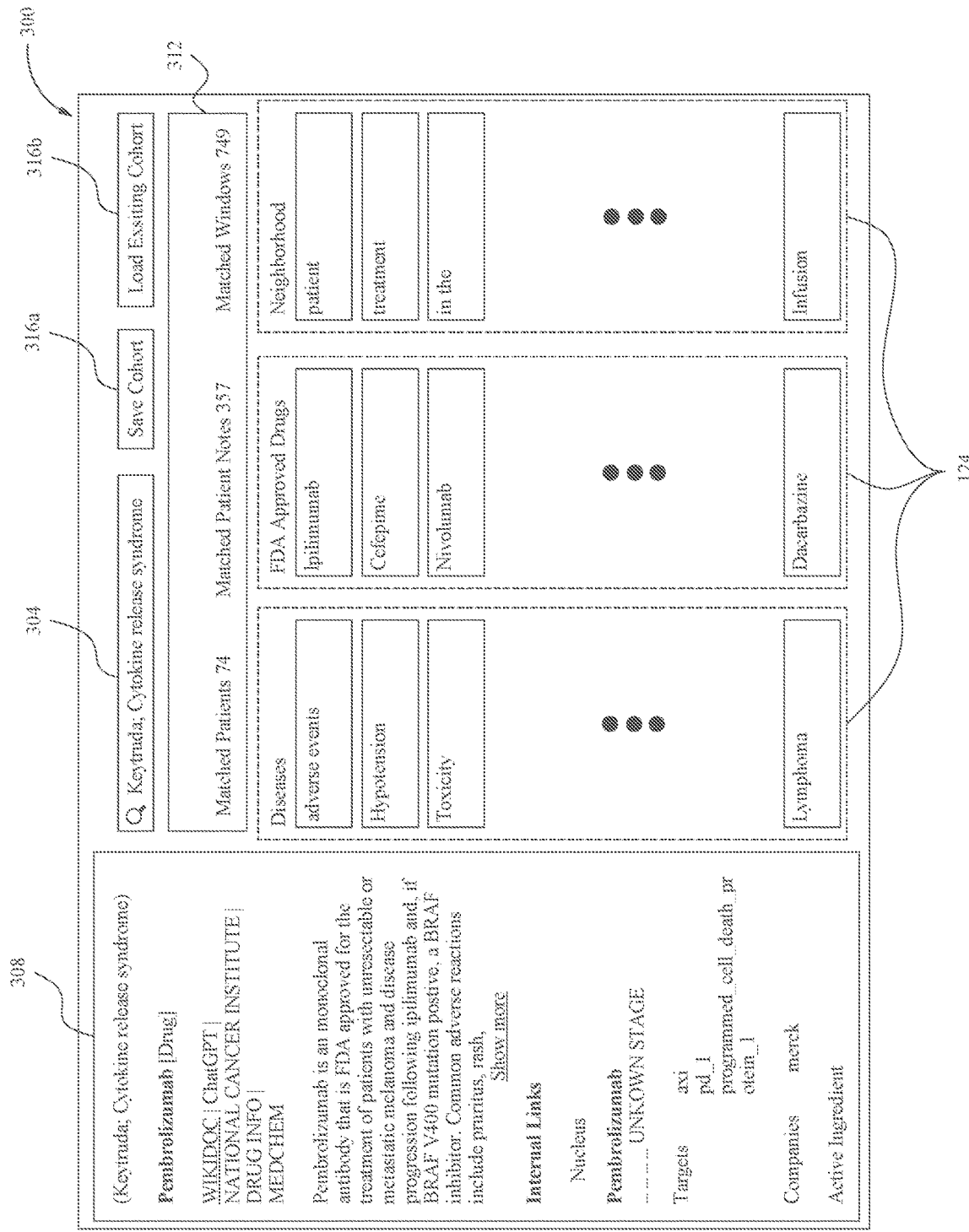
FIGS. 3A-B illustrate exemplary embodiments of a user interface.

Now referring to FIG. 3A, an exemplary embodiment of a user interface 300 is illustrated. In one or more embodiment, processor 104 may be configured to display, at a displaying device communicatively connected to processor 104, set of obfuscated data elements 124 and/or subset of obfuscated data elements 140 as described above through a user interface 300 of the displaying device. In some embodiments, processor 104 may generate a visual element and/or visual element data structure including and/or describing one or more data as described herein. As used in this disclosure, a "visual element" is a datum that is displayed visually to a user. In some embodiments, a visual element data structure may include a rule for displaying visual element. In some embodiments, a visual element data structure may be determined as a function of the verification of at least an obfuscated data element having a desirable distance measure. In some embodiments, processor 104 may generate a plurality of visual elements, wherein each visual element of the plurality of visual elements may include each obfuscated data element within subset of obfuscated data elements 140. In a non-limiting example, a visual element data structure may be generated such that one or more visual element describing or highlighting one or more obfuscated data elements are displayed to a user. In some embodiments, one or more visual elements may include one or more elements of text, images, shapes, charts, particle effects, interactable features, and the like. As a non-limiting example, a visual element may include a text output in a chatbot interface, an interactable feature for editing obfuscated data elements, or the like.

With continued reference to FIG. 3A, in some cases, visual element data structure may include instructions or rules governing if or when one or more visual elements are displayed. In a non-limiting example, visual element data structure may include an instruction causing at least one visual element describing at least one obfuscated data element to be displayed when a user selects one or more private data elements within database 112 using a graphical user interface (GUI). In another non-limiting example, visual element data structure may include instructions for presenting more than one visual element, or more than one visual element at a time. In an embodiment, about 1, 2, 3, 4, 5, 10, 20, or 50 visual elements are displayed simultaneously. In some cases, instruction may be applied to a single visual element or datum, or to more than one visual element or datum. In one embodiment, visual element data structure may categorize visual elements into one or more categories and may apply a rule to all visual elements and data thereof in a category, in an intersection of categories, or in a subsection of a category (such as all data in a first category and not in a second category). For example, and without limitation, a style applied to a visual element describing at least one obfuscated data element may also be applied to other visual elements describing other obfuscated data elements. In some embodiments, visual element may be interacted with; for instance, and without limitation, visual element may include an interface, such as a button or menu. In some embodiments, visual element may be interacted with using a user device such as a smartphone.

With continued reference to FIG. 3A, in some embodiments, visual element data structure may cause an event handler to be triggered in apparatus 100 or computing environment 156, such as, without limitation, a web browser. In some embodiments, triggering of an event handler may cause a change in any one of processing step as described herein such as, without limitation, display of visual element. As a non-limiting example, display may include, for example, a smartphone screen, a computer screen, or a tablet screen. In some cases, a display may include one or more physical interactive elements, such as buttons, a computer mouse, or a touchscreen, which allow user to input data into the display. In some cases, interactive elements may be configured to enable interaction between a user and apparatus 100. In some embodiments, visual element data structure may be determined as a function of data input by user into a display.

With continued reference to FIG. 3A, as a non-limiting example, user interface 300 may include at least a visual element 304 configured to accept a user input such as a search query or any other user input that may be fed into the system to retrieve, directly or indirectly from database 112, one or more (either private or obfuscated) data elements. In one or more embodiments, user interface 300 may include at least a visual element configured to provide additional information 308 associated with a data element in question. As a non-limiting example, such visual element may provide metadata (e.g., detailed information) about a drug sourced from database 112. In some cases, processor 104 may be configured to display, through one or more visual elements, statistical information 312 related to set of obfuscated data elements 124 or subset of obfuscated data elements 140; for example, and without limitation, numerical matched patient count and matched patient notes count may be displayed. In one or more embodiments, set of obfuscated data elements 124 or subset of obfuscated data elements 140 may be classified, using one or more classifier as described herein, into a plurality of categories. As a non-limiting example, one or more visual elements may be configured to display plurality of categories such as "diseases associated with the drug," "other FDA-approved drugs," "other related words (neighborhood)," and the like. Additionally, or alternatively, one or more visual elements may incorporate one or more event handlers configured to allow users to save, load, import, and export one or more displayed data elements e.g., current cohort or patients or existing cohort of patients, or implement any other functions that allow for transmission of set of obfuscated data elements 124 or subset of obfuscated data elements 140 to one or more requesting entities 152 within computing environment 156 as described herein. For example, and without limitation, user interface 300 may include one or more buttons 316a-b e.g., "Save Cohort," "Load Existing Cohort," and/or the like that allow users to refine, save, and/or work with one or more data elements.

With continued reference to FIG. 3A, as a non-limiting example, generative model 128 as described herein may generate one or more synthetic narrative for one or more sentiment classes in a carefully controlled manner. Processor

104 may ensure outputs of generative model 128 do not "hallucinate" or generate misleading medical information. In one embodiment, generative model 128 such as a LLM may be configured to generate content that is plausible and medically coherent but does not replicate any real patient's notes verbatim; for instance, and without limitation, in response to query "adverse event caused by Keytruda (pembrolizumab)," generative model 128 may generate a synthetic narrative such as "Patient with carcinoma of thyroid primary origin arising from a more differentiated papillary neoplasm, ongoing pembrolizumab therapy and recent radiation therapy to left thigh mass, acceptable tolerance of treatment #2 Hypercalcemia, treated and resolved it. Met again with Mrs. XXX and with her accompanying spouse. Mrs. XXX has done well so far in response to recent treatments. There are several caveats. First, we will premedicate with methylprednisolone in conjunction with this treatment as well as Benadryl because of her post infusion cytokine release syndrome for her first cycle." In cases involving specific treatments or side effects (e.g., "pembrolizumab therapy and recent radiation therapy" or "post infusion cytokine release syndrome") may be presented with synthesized evidence. User may manually inspect the evidence to gain conviction that apparatus 100 has correctly identified relevant cases without compromising patient confidentiality.

With continued reference to FIG. 3A, as another non-limiting example, an essence of patient's experience with Keytruda may be captured (from plurality of private data elements) to generate, using generative model 128, synthetic narrative such as "Bone marrow MRD came out to be negative. CT: No adenopathy or splenomegaly. Mm/dd/yy-Restaged: Marrow: 80% CLL. FISH: 13 q-x (37.5%). p53 mutated. CT: Significant adenopathy. Herpes zoster (C3, C4, and C5) and postherpetic neuralgia. 9. Sep. 2015-Pembrolizumab and ACP-196 (ACE-LY-667). 10. Mm/dd/yy to mm/dd/yy-Admitted for tumor flare and cytokine release syndrome (fever, elevated creatinine, respiratory failure, intubation, distributive shock, diffuse rash, acute-on-chronic renal failure with dialysis). Severe hypomagnesemia and hypophosphatemia. No infection source found. IV corticosteroids and taper. 11. Recurrent herpes zoster left shoulder and left anterior chest wall." In some cases, no real patient may be identified from such synthesized text; however, the synthesized text may still be used in medical research, education, clinical decision support tools or any other requesting entities as described herein. Other exemplary queries and corresponding synthetic narratives are described below.

Exemplary query 1: Educational (physician talking about potential side effects with the patient). Synthetic narrative A: "mm/dd/yy—Book research clinical trial mm/dd/yy through mm/dd/yy 2. Stage IIIB lung adenocarcinoma status post chemo radiation with ongoing pembrolizumab 3. New onset AFib with RVR RECOMMENDATIONS 1. complete last dose of REM on mm/dd/yy 2. Continue dexamethasone 6 mg daily for 10 day course through mm/dd/yy 3. Recommend obtaining CMP, magnesium, LDH, D-dimer, ferritin, and C reactive protein every other day 4. Anticoagulation as per COVID protocol for pulmonary embolus 5. Carefully monitor for increasing inflammatory markers, evidence of cytokine release syndrome, or at risk for cytokine release syndrome 6." Synthetic narrative B: "Seeking approval for pembrolizumab. ABC, RN, OCN, BSS, and I spoke with the patient about gaining approval for this. We reviewed specifically side effects including inciting immunoreactivity and autoimmune disease which can include problems with autoimmune liver/lung disease, arthritic disease, skin disease, or otherwise. The most common autoimmune disease incited would be thyroiditis, but the patient has no thyroid gland so this should not be an issue. We discussed that hypophysis can also be an issue, nonetheless. Generally, however, patients tolerated this therapy quite well. We reviewed that we have had one patient who had a cytokine release syndrome . . . "

Exemplary query 2: Differential Diagnosis (physician talking about the drug/disease as a potential differential diagnosis not a confirmed one). Synthetic narrative: "Observed intracranial infection with an LP. We would also recommend evaluating for an autoimmune encephalitis. There are case reports of Pembrolizumab-induced encephalopathy. We contacted our autoimmune colleagues for their input regarding the work up for a check point inhibitor related encephalitis. They recommended brain MRI, routine EEG, lumbar puncture with general parameters including oligoclonal bands and IgG index, autoimmune encephalopathy panel in the scrum and CSF, and CSF tests for viral encephalitis if clinically suspected. Also, her high procalcitonin could suggest cytokine release syndrome (CRS) vs. Infection. Other DDX includes toxic or metabolic encephalitis. Recommendations: 1) Obtain brain MRI (prior to LP)."

Exemplary query 3: Adverse Event caused by some other drug. Synthetic narrative: "Right cervical area. Mm/dd/yy surveillance PET scan revealed increased left lower lobe pulmonary nodule. Bronchial biopsy mm/dd/yy confirmed lymphoma involvement. He was enrolled in a clinical trial consisting of immunotherapeutic vaccine, low-dose cyclophosphamide and pembrolizumab. He underwent bypass surgery mm/dd/yy due to small-bowel obstruction related to lymphoma involvement of cecum and ascending colon. He received Yescarta CAR-T cell infusion mm/dd/yy which was complicated by neurotoxicity and cytokine release syndrome. His neutropenia has resolved. He continues on fluconazole and pentamidine prophylaxis per CAR-T protocol. He has hypogammaglobinemia and received IVIG on mm/dd/yy."

Figure 3B:
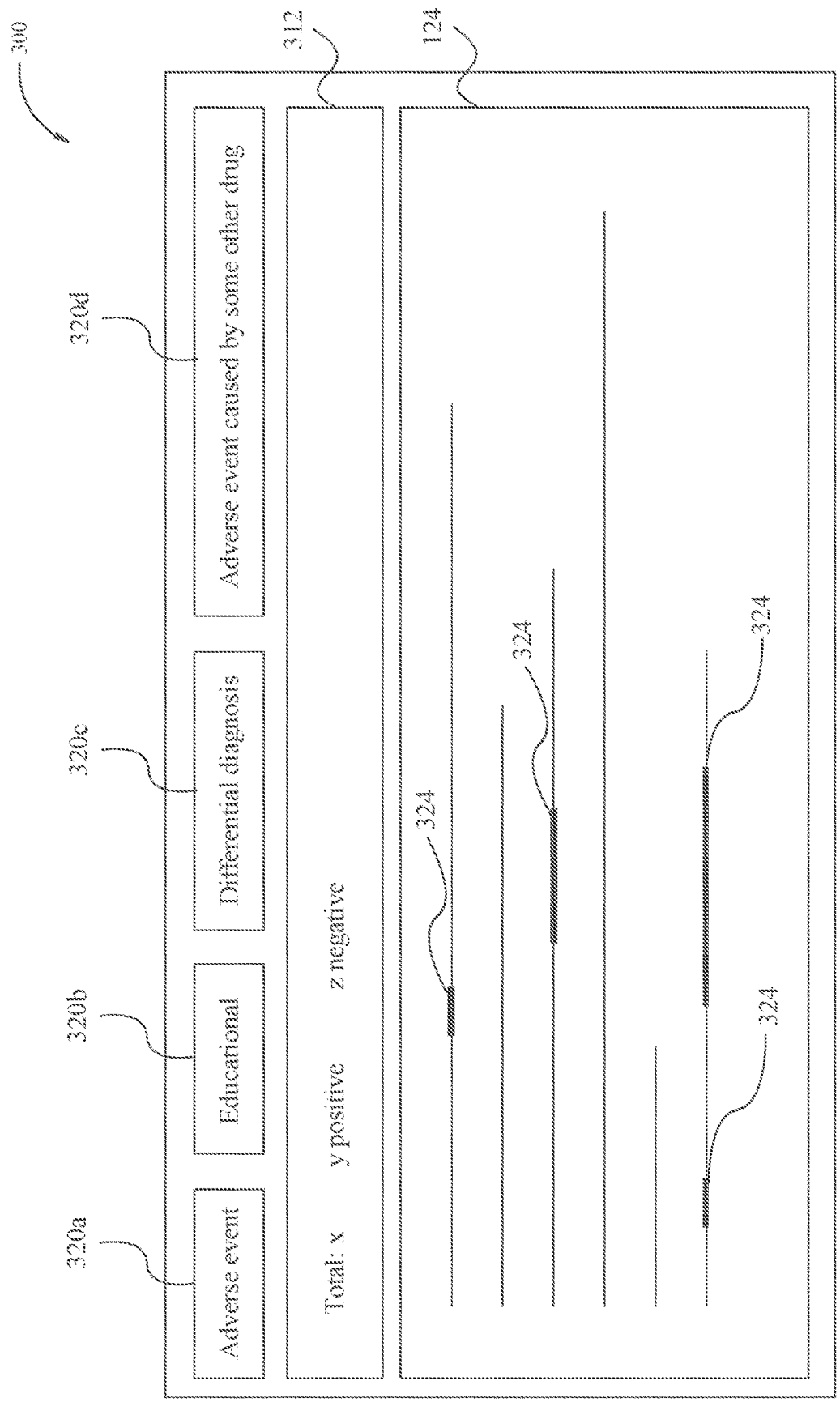

Now referring to FIG. 3B, another exemplary embodiment of user interface 300 is illustrated. In some embodiments, processor 102 may be configured to cluster sets of obfuscated data elements 124 or subsets of obfuscated data elements 140 in addition to plurality of private data elements 116 within database 112. Continuing with the previous non-limiting examples as described in FIG. 3A, generative model 128 (such as a transformer-based diffusion model or an autoregressive LLM as described above with reference to FIG. 1) may be configured to generate set of obfuscated data elements 124 upon user query a drug, such as "Pembrolizumab." Processor 104 may be configured to cluster set of obfuscated data elements 124 into one or more clusters 320a-d e.g., "adverse event," "educational," "differential diagnosis," and "adverse event caused by some other drug," wherein each cluster of the one or more clusters 320a-c may include a plurality of synthetic sentences or paragraphs (i.e., obfuscated data elements) that are indicative of the content in each cluster. For instance, and without limitation, generative model 128 may generate text that conveys the frequency or severity of adverse events associated with Pembrolizumab or other relevant drugs, educational material describing its use cases, and the like. In some cases, generative model 128 may generate narratives that reflect sentiment from cluster content. As a non-limiting example, for "adverse events," generative model 128 may create narrative describing common experiences or statistically significant outcomes without disclosing any individual patient's details.

In some cases, statistical information 312 such as, without limitation, total number of obfuscated data elements generated, total number of obfuscated data elements with a positive verification (i.e., subset of obfuscated data elements 140 fall within the defined constraint), or total number of obfuscated data elements with a negative (i.e., rest of obfuscated data elements fall outside the defined constraint), may be displayed alongside clusters 320a-d. Obfuscated data elements 124 may include one or more highlighted portions 324. A "highlighted portion," for the purposes of this disclosure, is a segment of a display of data that has been visually altered to draw the attention of a user. Highlighted portions 324 may include bold text. Highlighted portions 324 may include underlined text. Highlighted portions 324 may include italicized text. Highlighted portions 324 may include enlarged text. Highlighted portions 324 may include color highlighted text; as a non-limiting example, the background of a text segment may be replaced with a bright color, such as yellow, orange, green, blue, or the like, so as to capture the attention of a user. In some embodiments, highlighted portions may be surrounded by a marking, such as a circle, oval, rectangle, or the like. In some embodiments, highlighted portions may be indicated by an arrow or other indicating element. A person of ordinary skill in the art, after having reviewed the entirety of this disclosure, would appreciate that there are a variety of possible ways that highlighted portions 324 may be identified.

Figure 4:
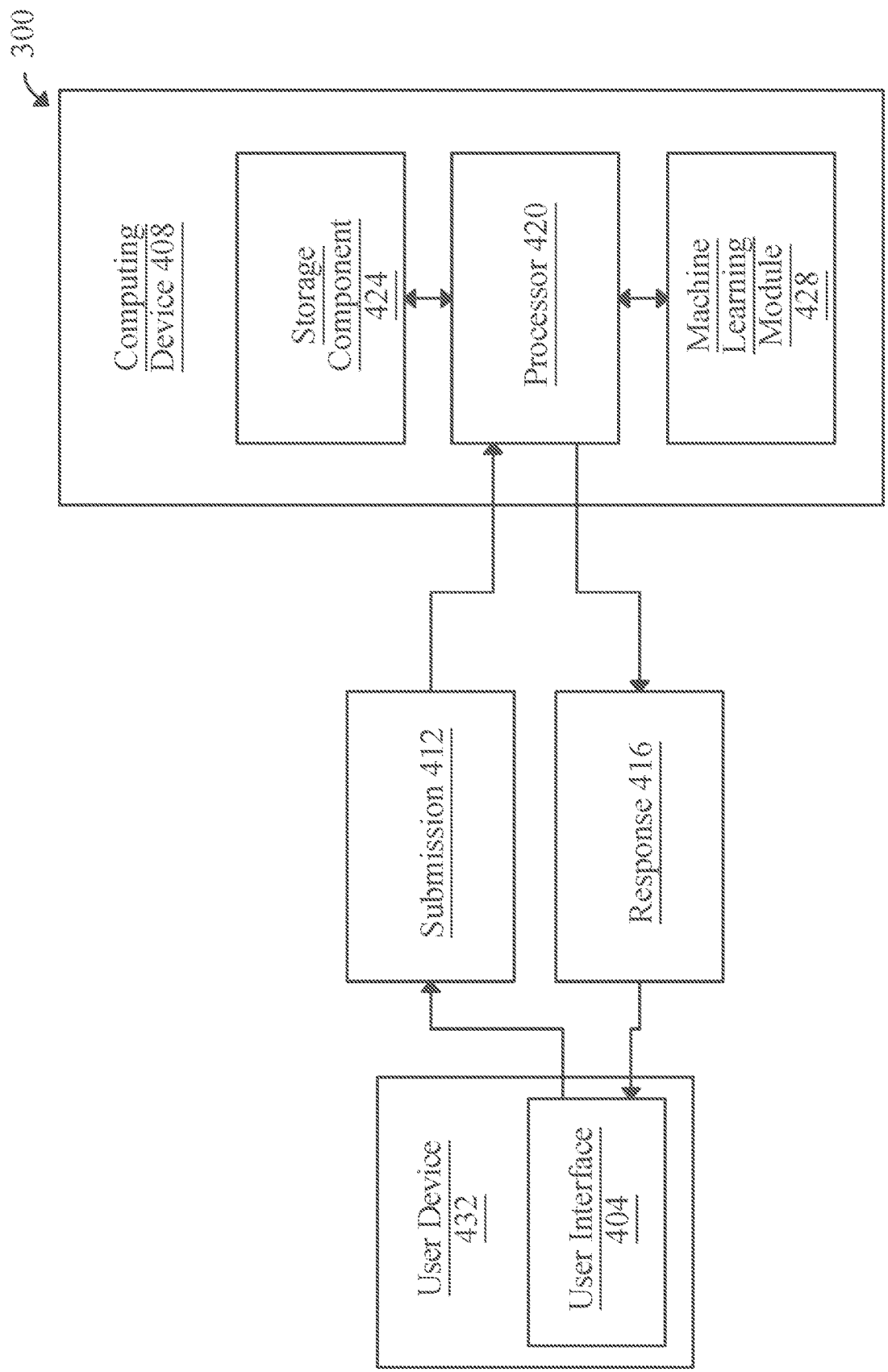
FIG. 4 illustrates an exemplary embodiment of a requesting entity.

Now referring to FIG. 4, an exemplary embodiment of a requesting entity 400 is illustrated. In one embodiment, requesting entity 400 may include a dialog agent such as, without limitation, a chatbot. In some embodiments, apparatus 100 may communicate with user and/or instructor using a chatbot. According to some embodiments, user interface 404 on user device 432 may be communicative with a computing device 408 that is configured to operate a chatbot. In some embodiments, user interface 404 may be local to user device 432. In some embodiments, user interface 404 may be local to computing device 408. Alternatively, or additionally, in some cases, user interface 404 may remote to user device 432 and communicative with user device 432, by way of one or more networks, such as without limitation the internet. Alternatively, or additionally, one or more user interfaces may communicate with computing device 408 using telephonic devices and networks, such as without limitation fax machines, short message service (SMS), or multimedia message service (MMS). Commonly, user communicate with computing device 408 using text-based communication, for example without limitation using a character encoding protocol, such as American Standard for Information Interchange (ASCII). Typically, user interfaces conversationally interface with a chatbot, by way of at least a submission, from a user interface to the chatbot, and a response, from the chatbot to the user interface. For example, user interface 404 may interface with a chatbot using submission 412 and response 416. In some embodiments, submission 412 and/or response 416 may use text-based communication. In some embodiments, submission 412 and/or response 416 may use audio communication.

Still referring to FIG. 4, submission 412, once received by computing device 408 operating a chatbot, may be processed by a processor 420. In some embodiments, processor 420 processes submission 412 using one or more of keyword recognition, pattern matching, and natural language processing. In some embodiments, processor employs real-time learning with evolutionary algorithms. In some cases, processor 420 may retrieve a pre-prepared response from at least a storage component 424, based upon submission 412. Alternatively, or additionally, in some embodiments, processor 420 communicates a response 416 without first receiving a submission, thereby initiating conversation. In some cases, processor 420 communicates an inquiry to user interface 404; and processor 420 is configured to process an answer to the inquiry in a following submission from the user interface. In some cases, an answer to an inquiry present within a submission from a user device may be used by computing device 408 as an input to another function. In some embodiments, computing device 408 may include machine learning module 428. Machine learning module 428 may include any machine learning models described herein, such as, without limitation, one or more LLMs. In some embodiments, submission 412 may be input into a trained machine learning model within machine learning module 428. In some embodiments, submission 412 may undergo one or more processing steps before being input into a machine learning model. In some embodiments, submission 412 may be used to train a machine learning model within machine learning module 428.

Figure 5:
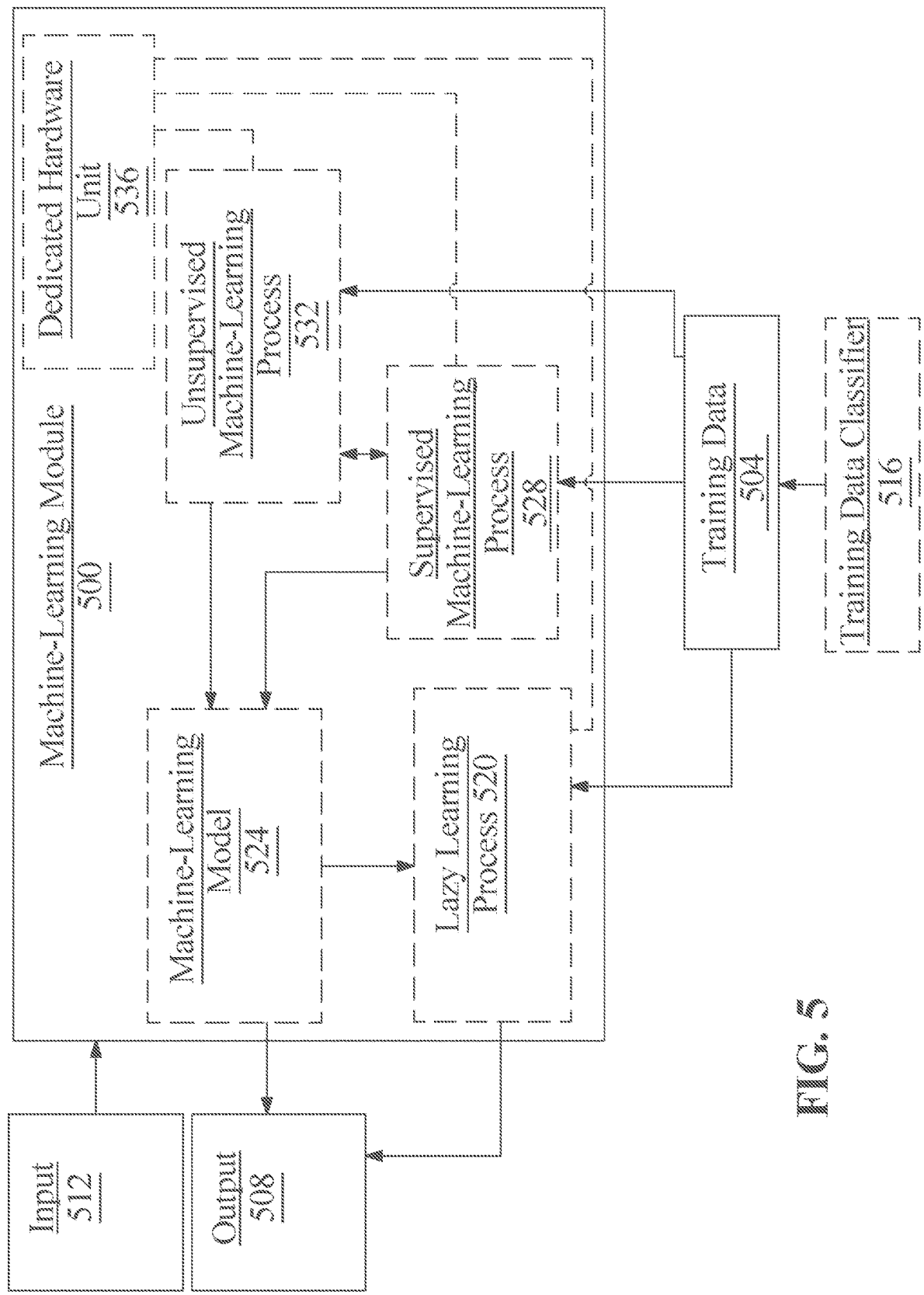
FIG. 5 illustrates a block diagram of exemplary embodiment of a machine learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, training data 504 may include set of finalized obfuscated data elements, plurality of private data elements within database, and/or the like as described above with reference to FIGS. 1-2.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data e.g., set of finalized obfuscated data elements into categories or labels. For instance, training data classifier 516 may classify finalized obfuscated data elements based on their relevance to different training modules of a LLM (in a particular domain), complexity, subject matter, or the like.

Still referring to FIG. 5, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25th percentile value and the 50th percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 5, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or GAN as described above; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include a plurality of obfuscated data elements as described above as inputs, a plurality of discriminative tags e.g., "real" or "fake" as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
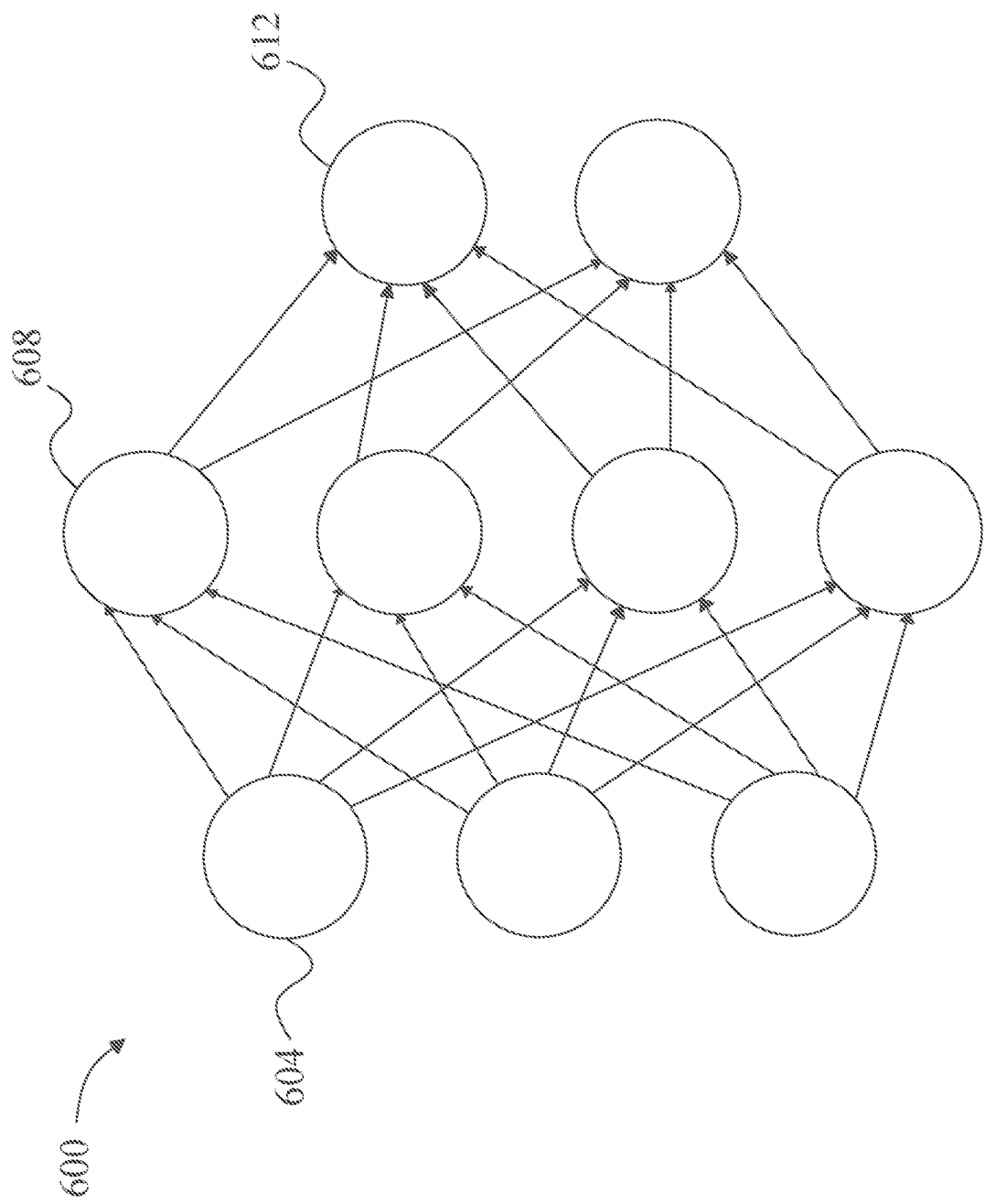
FIG. 6 illustrates a diagram of an exemplary nodal network.
Figure 7:
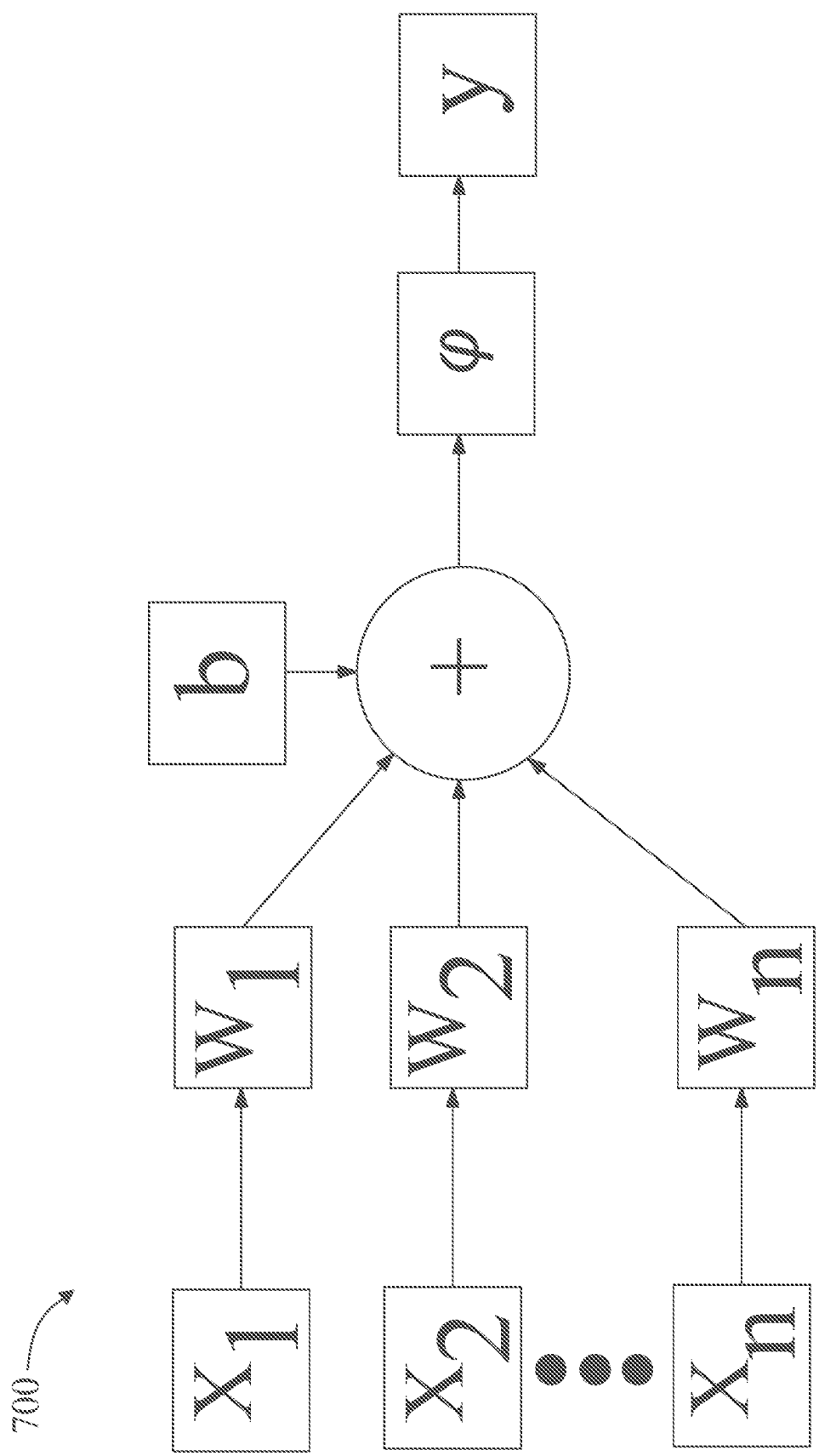
FIG. 7 illustrates a block diagram of an exemplary node.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

With continued reference to FIG. 6, as a further non-limiting example, a neural network may include a convolutional neural network comprising an input layer of nodes, one or more intermediate layers, and an output layer of nodes. A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data through a sliding window approach. In some cases, convolution operations may enable processor 104 to detect local/global patterns, edges, textures, and any other features described herein within plurality of private data elements. Detected patterns and/or features may be passed through one or more activation functions, such as without limitation, Rectified Linear Unit (ReLU), to introduce non-linearities into the processing step of, for example, and without limitation, generating set of obfuscated data elements as described above. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the dimensions of feature maps by applying downsampling, such as max-pooling or average pooling, to small, non-overlapping regions of one or more features. CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, obfuscated data elements. Additionally, or alternatively, each fully connected layer may be followed by one or more dropout layers configured to prevent overfitting, and one or more normalization layers to stabilize the learning process described herein. Training the generative model 128 including a CNN may include selecting a suitable loss function to guide the training process. In a non-limiting example, a loss function that measures the difference between the predicted output and the ground truth may be used, such as, without limitation, mean squared error (MSE) or a custom loss function may be designed for one or more embodiments described herein. Additionally, or alternatively, optimization algorithms, such as stochastic gradient descent (SGD), may then be used to adjust the generative model's 128 parameters to minimize such loss.

Referring now to FIG. 6, an exemplary embodiment of a node 700 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax, x)$ for some a, an exponential linear units function such as $$f(x) = \lambda \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{\sqrt{2/\pi}}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
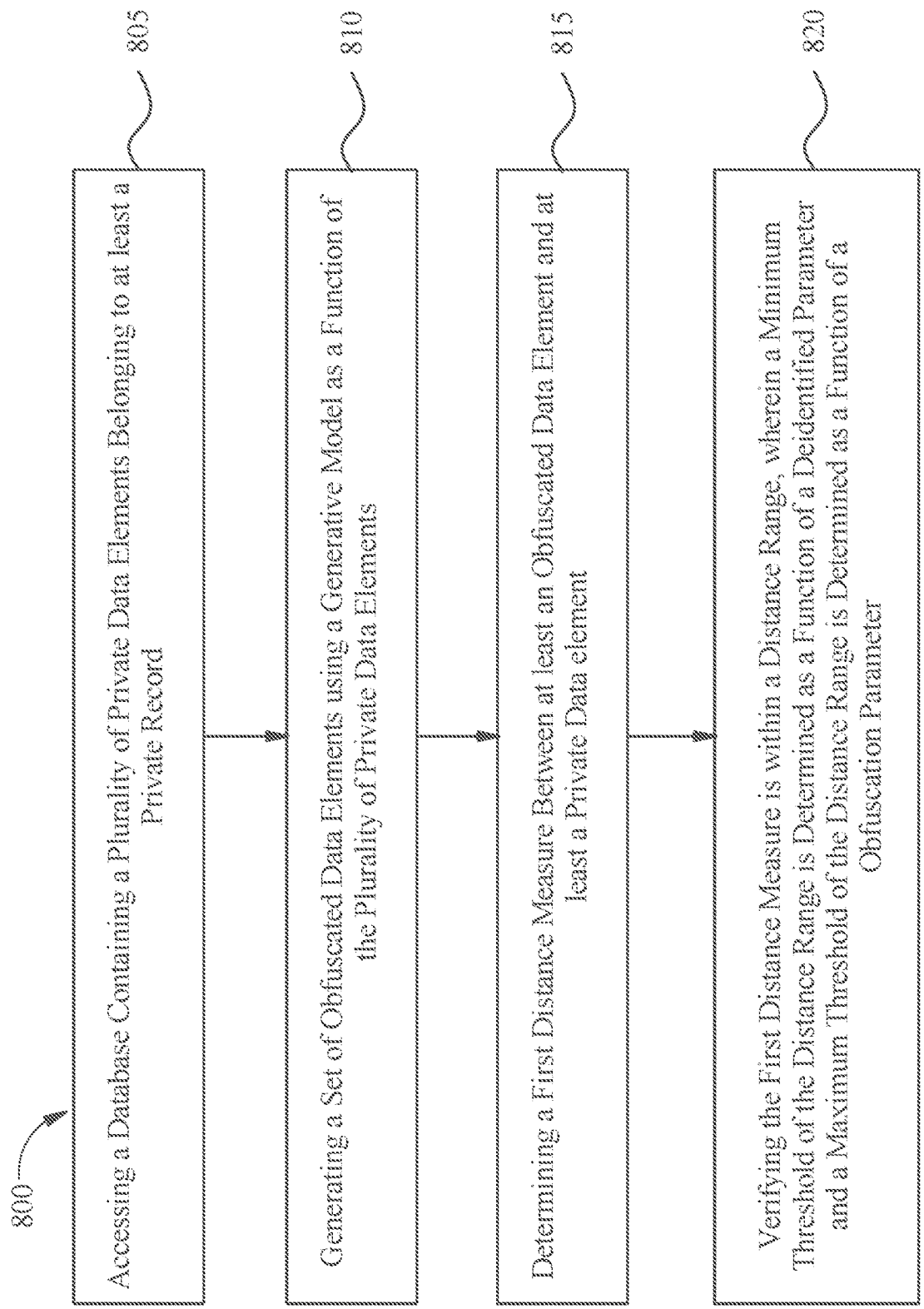
FIG. 8 is a flow diagram illustrating an exemplary method for generating obfuscated data within a computing environment.
Figure 9:
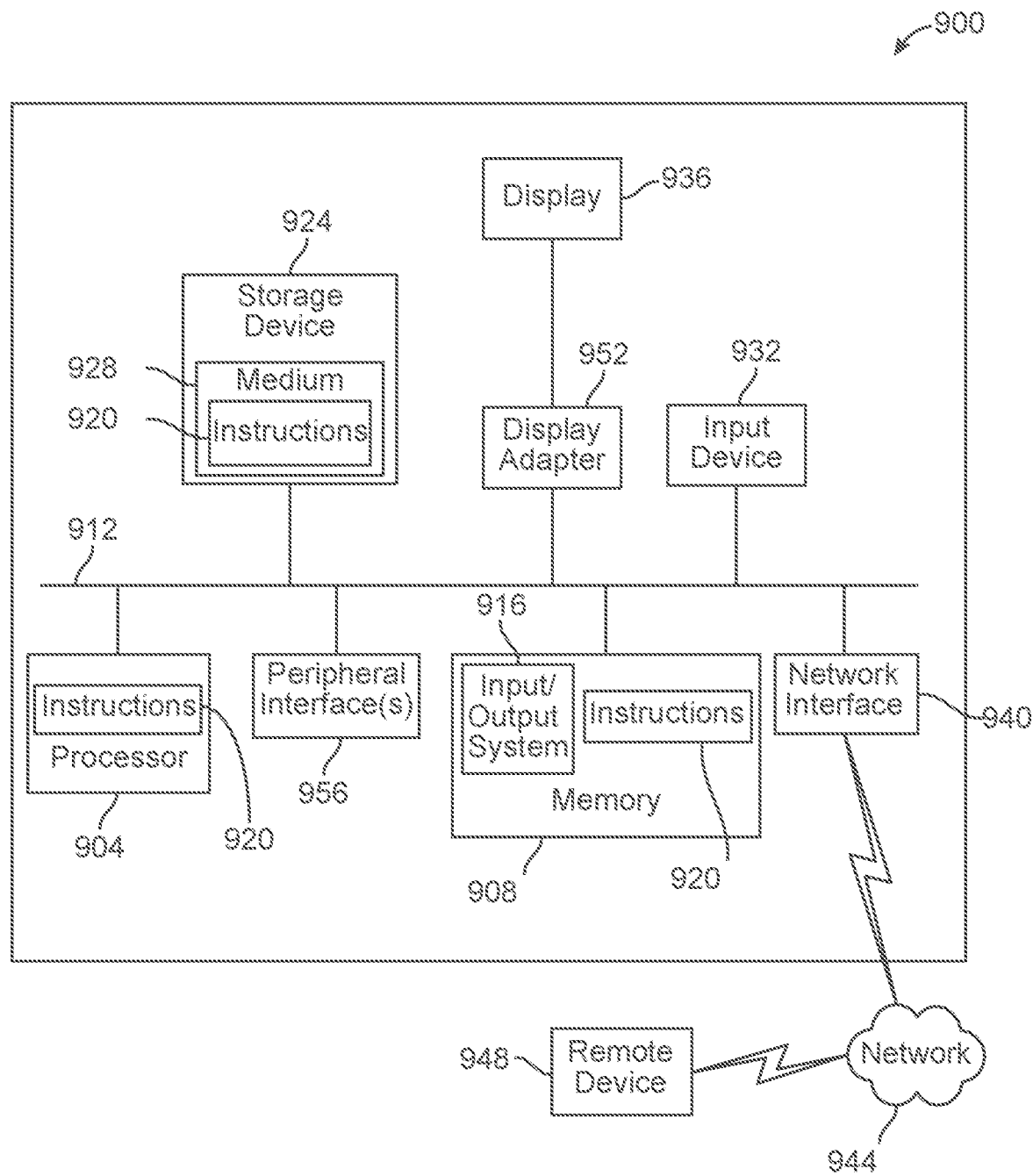
FIG. 9 is a block diagram of a computing system that can be used to implement any one or more of the methodologies disclosed herein and any one or more portions thereof.

Now referring to FIG. 8, a flow diagram of an exemplary embodiment of a method 800 for generating obfuscated data within a computing environment is illustrated. The method 800 includes a step 805 of accessing, by at least a processor, a database containing a plurality of private data elements belonging to at least a private record. This may be implemented, without limitation, as described above with reference to FIGS. 1-7.

With continued reference to FIG. 8, method 800 includes a step 810 of generating, by the at least a processor, a set of obfuscated data elements using an generative model as a function of the plurality of private data elements. In some embodiments, generating the set of obfuscated data elements may include sampling from a noise distribution on a deidentified version of the plurality of private data elements. In some embodiments, the generative model may include a LLM. This may be implemented, without limitation, as described above with reference to FIGS. 1-7.

With continued reference to FIG. 8, method 800 includes a step 815 of determining, by the at least a processor, a first distance measure between at least an obfuscated data element within the set of obfuscated data elements and at least a private data element of the plurality of private data elements within the database. This may be implemented, without limitation, as described above with reference to FIGS. 1-7.

With continued reference to FIG. 8, method 800 includes a step 820 of verifying, for the at least an obfuscated data element within the set of obfuscated data elements, the first distance measure is within a distance range, wherein a minimum threshold of the distance range is determined as a function of a deidentification parameter, and a maximum threshold of the distance range is determined as a function of an obfuscation parameter. In some embodiments, the deidentification parameter may include a privacy protection level associated with at least one pre-determined domain. In some embodiments, the obfuscation parameter may include an obfuscation risk tolerance level. This may be implemented, without limitation, as described above with reference to FIGS. 1-7.

With continued reference to FIG. 8 method 800 may further includes a step of fine-tuning, by the at least a processor, the generative model on a subset of the private data elements selected from the plurality of private data elements within the database corresponding to at least one pre-determined domain. This may be implemented, without limitation, as described above with reference to FIGS. 1-7.

With continued reference to FIG. 8, method 800 may further includes a step of selecting a subset of obfuscated data elements from the set of obfuscated data elements as a function of the verification, and transmitting, by the at least a processor, the subset of obfuscated data elements to one or more requesting entities within a computing environment. In some embodiments, the one or more requesting entities may include at least a large language model (LLM) deployed within the computing environment. This may be implemented, without limitation, as described above with reference to FIGS. 1-7.

With continued reference to FIG. 8, method 800 may further includes a step of clustering the plurality of private data elements within the database into a plurality of clusters using at least a clustering algorithm and selecting the subset of obfuscated data elements from the set of obfuscated data elements as a function of the plurality of clusters. In some embodiments, each cluster of the plurality of clusters may include a cluster centroid and a defined radius of influence. In some embodiments, selecting the subset of obfuscated data elements from the set of obfuscated data elements may include determining a second distance measure between the cluster centroid of at least a cluster of the plurality of clusters and the at least a private data element of the plurality of private data elements within the database, verifying, for the cluster centroid of at least a cluster of the plurality of clusters, the second distance measure is within the distance range, and selecting the subset of obfuscated data elements from the set of obfuscated data elements as a function of the verification. This may be implemented, without limitation, as described above with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 8 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display 936. Examples of a display device include, but are not limited to, a liquid crystal display (LCD), a cathode ray tube (CRT), a plasma display, a light emitting diode (LED) display, and any combinations thereof. Display adapter 952 and display 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for generating obfuscated data within a computing environment, the apparatus comprising:
    at least a processor; and
    a memory communicatively connected to the at least a processor, wherein the memory contains instructions configuring the at least a processor to:
        access a database containing a plurality of private data elements belonging to at least a private record;
        generate, using a generative model a set of obfuscated data elements, representative of the at least a private record, as a function of the plurality of private data elements;
        determine a first distance measure between at least an obfuscated data element within the set of obfuscated data elements and at least a private data element of the plurality of private data elements within the database; and
        verify, for the at least an obfuscated data element within the set of obfuscated data elements, the first distance measure is within a distance range, wherein:
            a minimum threshold of the distance range is determined as a function of a deidentification parameter; and
            a maximum threshold of the distance range is determined as a function of an obfuscation parameter;
        cluster the plurality of private data elements within the database into a plurality of clusters using at least a clustering algorithm;
        select a subset of obfuscated data elements from the set of obfuscated data elements as a function of both the plurality of clusters and the verification; and
        transmit the subset of obfuscated data elements to one or more requesting entities within a computing environment.

2. The apparatus of claim 1, wherein generating the set of obfuscated data elements comprises sampling from a noise distribution on a deidentified version of the plurality of private data elements.

3. The apparatus of claim 1, wherein the generative model comprises a large language model (LLM).

4. The apparatus of claim 1, wherein the generative model comprises a transformer-based diffusion model.

5. The apparatus of claim 1, wherein the memory further contains instructions configuring the at least a processor to: fine-tune the generative model on a subset of the private data elements selected from the plurality of private data elements within the database corresponding to at least one pre-determined domain.

6. The apparatus of claim 1, wherein the deidentification parameter comprises a privacy protection level associated with at least one pre-determined domain.

7. The apparatus of claim 1, wherein the obfuscation parameter comprises an obfuscation risk tolerance level.

8. The apparatus of claim 1, wherein:
    at least a cluster of the plurality of clusters comprises a cluster centroid and a defined radius of influence; and
    selecting the subset of obfuscated data elements from the set of obfuscated data elements comprises:
        determining a second distance measure between the cluster centroid of at least a cluster of the plurality of clusters and at least a private data element of the plurality of private data elements within the database;
        verifying, for the cluster centroid of the at least a cluster of the plurality of clusters, the second distance measure is within the distance range; and
        selecting the subset of obfuscated data elements from the set of obfuscated data elements as a function of the verification.

9. A method for generating obfuscated data within a computing environment, the method comprising:
    accessing, by at least a processor, a database containing a plurality of private data elements belonging to at least a private record;
    generating, by the at least a processor, a set of obfuscated data elements using a generative model as a function of the plurality of private data elements;
    determining, by the at least a processor, a first distance measure between at least an obfuscated data element within the set of obfuscated data elements and at least a private data element of the plurality of private data elements within the database; and
    verifying, for the at least an obfuscated data element within the set of obfuscated data elements, the first distance measure is within a distance range, wherein:
        a minimum threshold of the distance range is determined as a function of a deidentification parameter; and
        a maximum threshold of the distance range is determined as a function of an obfuscation parameter;
    cluster, by the at least a processor, the plurality of private data elements within the database into a plurality of clusters using at least a clustering algorithm;
    select, by the at least a processor, a subset of obfuscated data elements from the set of obfuscated data elements as a function of both the plurality of clusters and the verification; and
    transmit, by the at least a processor, the subset of obfuscated data elements to one or more requesting entities within a computing environment.

10. The method of claim 9, wherein generating the set of obfuscated data elements comprises sampling from a noise distribution on a deidentified version of the plurality of private data elements.

11. The method of claim 9, wherein the generative model comprises a large language model (LLM).

12. The method of claim 9, wherein the generative model comprises a transformer-based diffusion model.

13. The method of claim 9, further comprising:
    fine-tuning, by the at least a processor, the generative model on a subset of the private data elements selected from the plurality of private data elements within the database corresponding to at least one pre-determined domain.

14. The method of claim 9, wherein the deidentification parameter comprises a privacy protection level associated with at least one pre-determined domain.

15. The method of claim 9, wherein the obfuscation parameter comprises an obfuscation risk tolerance level.

16. The method of claim 9, wherein:
at least a cluster of the plurality of clusters comprises a cluster centroid and a defined radius of influence; and
selecting the subset of obfuscated data elements from the set of obfuscated data elements comprises:
determining a second distance measure between the cluster centroid of at least a cluster of the plurality of clusters and the at least a private data element of the plurality of private data elements within the database;
verifying, for the cluster centroid of the at least a cluster of the plurality of clusters, the second distance measure is within the distance range; and
selecting the subset of obfuscated data elements from the set of obfuscated data.

* * * * *